United States Patent
Park et al.

(10) Patent No.: US 11,924,789 B2
(45) Date of Patent: *Mar. 5, 2024

(54) METHOD AND APPARATUS FOR BROADCAST CHANNEL CONFIGURATION AND BROADCAST CHANNEL TRANSMISSION AND RECEPTION FOR COMMUNICATION SYSTEM

(71) Applicant: Innovative Technology Lab Co., Ltd., Seoul (KR)

(72) Inventors: Dong Hyun Park, Seoul (KR); Sung Jun Yoon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,099

(22) Filed: Oct. 31, 2022

(65) Prior Publication Data

US 2023/0110537 A1    Apr. 13, 2023

Related U.S. Application Data

(63) Continuation of application No. 17/714,641, filed on Apr. 6, 2022, now Pat. No. 11,503,556, which is a
(Continued)

(30) Foreign Application Priority Data

| Feb. 7, 2017 | (KR) | 10-2017-0016589 |
| May 4, 2017 | (KR) | 10-2017-0056755 |
| Jul. 24, 2017 | (KR) | 10-2017-0093736 |

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04L 5/005* (2013.01);
(Continued)

(58) Field of Classification Search
None
See application file for complete search history.

(56) References Cited

U.S. PATENT DOCUMENTS

| 2014/0293913 A1* | 10/2014 | Yen | H04L 5/0053 370/329 |
| 2017/0353254 A1 | 12/2017 | Islam et al. | |

FOREIGN PATENT DOCUMENTS

| CN | 102271023 | | 1/2013 |
| TW | 201720085 | * | 6/2017 |
| WO | 2015042004 | | 3/2015 |

OTHER PUBLICATIONS

International Search Report for International Patent Application No. PCT/KR2018/001665.
(Continued)

*Primary Examiner* — Andre Tacdiran

(57) ABSTRACT

A method, apparatus, and system for transmitting and receiving a physical broadcast channel (PBCH) are provided. A base station may perform a first scrambling process on PBCHs in a time period before a channel coding, and perform a second scrambling process after the channel coding. PHCH payloads and PBCH DMRS may provide information bits to be used in the scrambling processes. A wireless user device may receive one or more PBCHs transmitted from the base station.

27 Claims, 11 Drawing Sheets

Related U.S. Application Data continuation of application No. 17/398,985, filed on Aug. 10, 2021, which is a continuation of application No. 16/823,232, filed on Mar. 18, 2020, now Pat. No. 11,122,529, which is a continuation of application No. 15/890,507, filed on Feb. 7, 2018, now Pat. No. 10,638,436.

(51) Int. Cl.
  *H04L 25/03* (2006.01)
  *H04W 72/044* (2023.01)
  *H04W 72/30* (2023.01)

(52) U.S. Cl.
  CPC ...... *H04L 5/0053* (2013.01); *H04L 25/03866* (2013.01); *H04W 72/0466* (2013.01); *H04W 72/30* (2023.01)

(56) References Cited

U.S. PATENT DOCUMENTS

| | | | |
|---|---|---|---|
| 2018/0139712 A1 | 5/2018 | Abedini et al. | |
| 2018/0159671 A1* | 6/2018 | Kim | H04W 72/0446 |
| 2018/0167946 A1 | 6/2018 | Si et al. | |
| 2018/0213495 A1* | 7/2018 | Kim | H04L 27/2656 |
| 2018/0227866 A1* | 8/2018 | Jung | H04L 5/0053 |
| 2018/0343571 A1 | 11/2018 | Kim et al. | |
| 2019/0007896 A1* | 1/2019 | Ye | H04L 1/0068 |
| 2019/0200306 A1 | 6/2019 | Ko et al. | |
| 2019/0238270 A1* | 8/2019 | Pan | H04L 1/0067 |
| 2019/0281534 A1* | 9/2019 | Yu | H04J 11/0076 |
| 2019/0319745 A1* | 10/2019 | Pan | H04L 1/0041 |
| 2019/0326934 A1* | 10/2019 | Kim | H04L 1/08 |
| 2019/0349108 A1 | 11/2019 | Takeda et al. | |
| 2019/0357159 A1* | 11/2019 | Pan | H04L 5/0051 |
| 2019/0393972 A1* | 12/2019 | Pan | H04W 72/30 |
| 2020/0015197 A1 | 1/2020 | Harada et al. | |
| 2020/0100214 A1* | 3/2020 | Wei | H04L 5/0048 |

OTHER PUBLICATIONS

Written Opinion of the International Searching Authority for International Patent Application No. PCT/KR2018/001665.

Notification of Transmittal of the International Search Report and the Written Opinion of the International Searching Authority, or the Declaration (PCT/KR2018/001665).

3GPP TSG RAN WG1 Meeting #87 R1-1611787 Reno, USA Nov. 14-18, 2016. "NR PBCH Design". LG Electronics.

3GPP TSG RAN WG1 Meeting #87 R1-1613008 Reno, USA Nov. 14-18, 2016. "Discussion of PBCH Transmission in NR". Convida Wireless, InterDigital Communications.

3GPP TSG RAN WG1 Meeting #87 R1-1612028 Reno, NV, U.S.A. Nov. 14-18, 2016. "Multi-beam PBCH design". Qualcomm Incorporated.

3GPP TSG RAN WG1 #87 R1-1612807 Reno, USA Nov. 14-18, 2016. "NR-PBCH Design". Nokia, Alcatel-Lucent Shanghai Bell.

3GPP TSG RAN WG1 NR Ad-Hoc #2 R1-1711276 Qingdao, P. R. China, Jun. 27-30, 2017. "Indication of SS block timing information". Motorola mobility, Lenovo.

3GPP TSG RAN WG1 Meeting #89 R1-1709868 Hangzhou, China, May 15-19, 2017. "Summary of email discussion [89-15] Details for NR-PBCH evaluation". Ericsson.

Supplementary Partial European Search Report for European Patent Application No. 18751996.2 dated on Dec. 14, 2020.

ZTE, "NB-PBCH design for NB-IoT", R1-160042, 3GPP TSG RAN WG1 NB-IoT Ad-Hoc Meeting, Budapest, Hungary, Jan. 18-20, 2016, pp. 1-6.

Samsung, "NB-PBCH Design", R1-160138, 3GPP TSG RAN WG1 NB-IoT Ad-Hoc Meeting, Budapest, Hungary, Jan. 18-20, 2016, pp. 1-5.

\* cited by examiner

METHOD AND APPARATUS FOR BROADCAST CHANNEL CONFIGURATION AND BROADCAST CHANNEL TRANSMISSION AND RECEPTION FOR COMMUNICATION SYSTEM

CROSS-REFERENCE TO RELATED APPLICATIONS

This application is a continuation of U.S. application Ser. No. 17/714,641, filed on Apr. 6, 2022, which is a continuation of U.S. application Ser. No. 17/398,985, filed on Aug. 10, 2021, which is a continuation of U.S. application Ser. No. 16/823,232, filed on Mar. 18, 2020, now issued as U.S. Pat. No. 11,122,529 on Sep. 14, 2021, which is a continuation of U.S. application Ser. No. 15/890,507, filed on Feb. 7, 2018, now issued as U.S. Pat. No. 10,638,436 on Apr. 28, 2020, which claims priority from and the benefit of Korean Patent Application Nos. 10-2017-0016589, 10-2017-0056755, 10-2017-0093736, respectively filed on Feb. 7, 2017, May 4, 2017, and Jul. 24, 2017, which are hereby incorporated by reference in their entirety.

BACKGROUND

1. Field

The present disclosure relates to a wireless communication system, and more particularly, to a method and apparatus for configuring a broadcast channel, and for transmitting and receiving a broadcast channel in a New Radio (NR) system.

2. Discussion of the Background

The IMT (International Mobile Telecommunication) frameworks and standards have been developed by ITU (International Telecommunication Union) and, recently, the $5^{th}$ generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility, or the like. However, a method of configuring a broadcast channel, and transmitting and receiving a broadcast channel in the NR system has not been yet concretely determined.

SUMMARY

A method and an apparatus for transmitting and receiving a broadcast channel in an NR system are provided.

An apparatus may explicitly indicate a part of frame information through a broadcast channel, and implicitly indicate the remaining part of the frame information.

A base station may perform a first scrambling process on physical broadcast channels (PBCHs) in a time period and may perform a second scrambling process after the channel coding. PHCH payloads and PBCH DMRS may provide information bits to be used in the scrambling processes.

DETAILED DESCRIPTION OF THE ILLUSTRATED EMBODIMENTS

Figure 1:
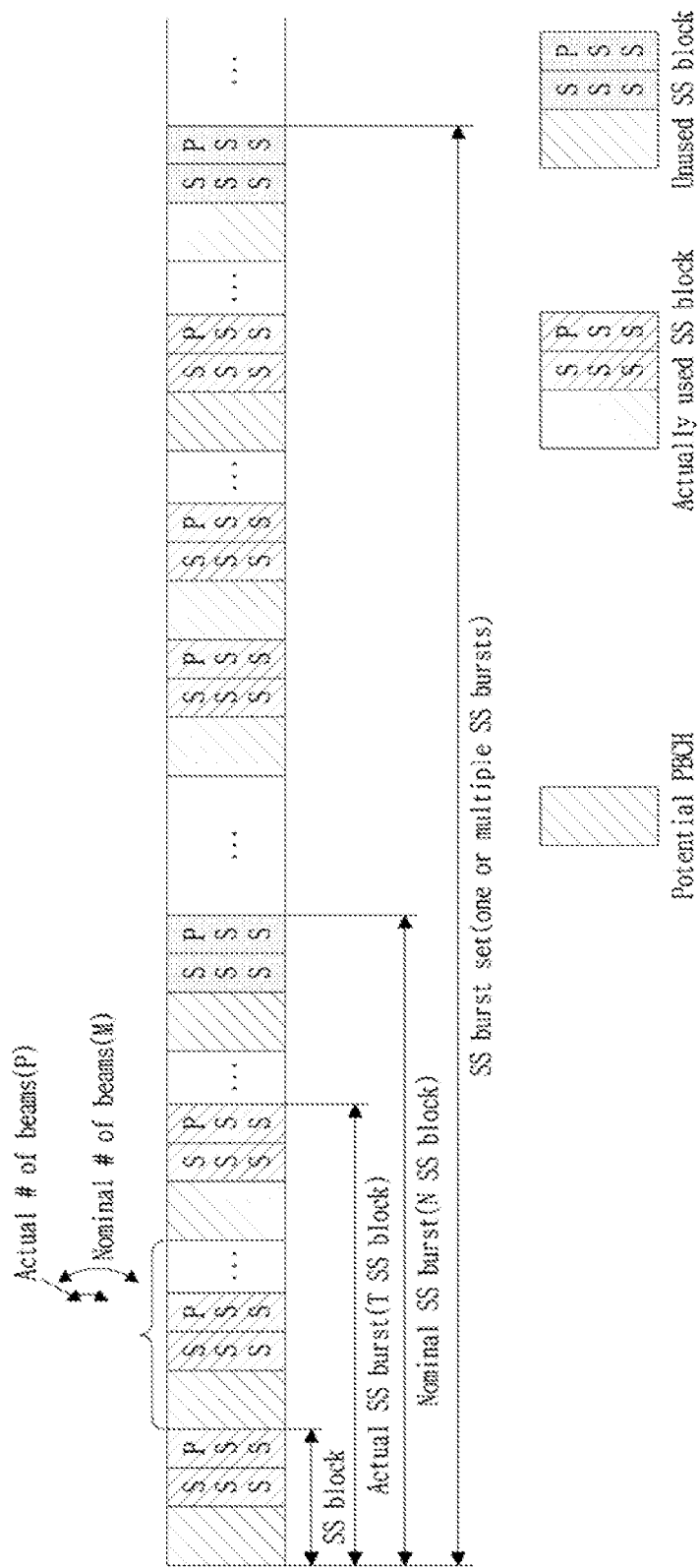
FIG. 1 is a diagram illustrating the configurations of an SS block, an SS burst, and an SS burst set, to which the present disclosure is applicable.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

Hereinafter, a description is made by illustrating exemplary embodiments based on a $3^{rd}$ Generation Partnership Project (3GPP) communications system called "IMT for 2020 and beyond", or the $5^{th}$ generation (5G) communication system. However, it is only an example and the present invention may be applied to further various wireless communication systems.

It is apparent that a base station or other network nodes other than the base station may be capable of performing various operations performed for communication with a terminal in a network including a plurality of network nodes including the base station. The 'BS (Base Station)' may be replaced with the terms, such as, a fixed station, a Node B, an eNode B (eNB), a gNodeB (gNB), an AP (Access Point), and the like. Also, the 'terminal' may be replaced with the terms, such as a UE (User Equipment), an MS (Mobile Station), an MSS (Mobile Subscriber Station), an SS (Subscriber Station), a non-AP STA (non-AP station), and the like.

In the present disclosure, transmitting or receiving a channel may include the meaning of transmitting or receiving a signal or information through the corresponding channel. For example, transmitting a control channel may indicate that a control signal or control information is transmitted through the control channel. Similarly, transmitting a data channel may indicate that transmitting a data signal or data information is transmitted through the data channel.

Hereinafter, the term "NR system" is used to distinguish a system to which various embodiments of the present disclosure are applied from the conventional system. However, the scope of the present disclosure may not be limited by the term. Also, the term "NR system" in the present specification is used as an example of a wireless communication system that is capable of supporting various numerologies. However, the term "NR system" is not limited to a wireless communication system that supports a plurality of SCSs.

First, a numerology that is considered by the NR system will be described.

An NR numerology may indicate the numerical value of the basic element or factor that generates a resource grid in the time-frequency domain for designing the NR system. For example, as an example of the numerology of the 3GPP LTE/LTE-A system, subcarrier spacing corresponds to 15 kHz (or 7.5 kHz in the case of MBSFN (Multicast-Broadcast Single-Frequency Network)). In this instance, the term "numerology" is not limited to subcarrier spacing, and may include the length of CP (Cyclic Prefix), the length of a TTI (Transmit Time Interval), the number of OFDM (Orthogonal Frequency Division Multiplexing) symbols within a predetermined time interval, the duration of a single OFDM symbol, or the like, which is associated with subcarrier spacing (or which is determined based on subcarrier spacing). That is, different numerologies may be distinguished by a difference in at least one of subcarrier spacing, a CP length, a TTI length, the number of OFDM symbols within a predetermined time interval, or the duration of a single OFDM symbol.

In order to satisfy the requirements from "IMT for 2020 and beyond", the current 3GPP NR system considers a plurality of numerologies by taking into consideration various scenarios, various service requirements, compatibility with a potential new system, or the like. More particularly, the numerology of the conventional wireless communication system is difficult to support a high frequency band, a fast moving speed, a low latency, or the like which required from "IMT for 2020 and beyond", and thus, it is needed to define a new numerology.

For example, the NR system is capable of supporting applications, such as eMBB (enhanced Mobile Broadband), mMTC (massive Machine Type Communications)/uMTC (Ultra Machine Type Communications), URLLC (Ultra-Reliable and Low Latency Communications), and the like. Particularly, the requirement associated with a user plane latency for URLLC and eMBB services is 0.5 ms in an uplink and is 4 ms in both uplink and downlink, which requires a significant decrease in the latency when compared to 10 ms, which is the requirement associated with the latency of 3GPP LTE (Long Term Evolution) and LTE-A (LTE-Advanced) system.

Also, requirements for performing beam-based transmission and for coping with signal attenuation in a high frequency band (over 6 GHz) may exist in the NR system.

To enable a single NR system to satisfy various scenarios and various requirements, the NR system needs to support various numerologies. Particularly, the NR system needs to support a plurality of SCSs, unlike the conventional LTE/LTE-A system that supports a single subcarrier spacing (SCS) basically.

A new numerology for the NR system including supporting of a plurality of SCSs may be determined by assuming a wireless communication system that operates in a frequency range or carrier, such as 6 GHz or 40 GHz, in order to overcome the problems in that a broadband cannot be used in the conventional frequency range or carrier, such as 700 MHz or 2 GHz. However, the scope of the present disclosure may not be limited thereto.

In order to newly define the above described NR system, it is preferentially required to define a synchronization scheme as an initial step for a mobile communication terminal to access a network. However, a scheme of configuring a synchronization signal for supporting synchronization, a scheme of mapping a synchronization signal onto the time-frequency resources and transmitting the same, a scheme of receiving a synchronization signal mapped onto the time-frequency resources have not been yet concretely defined.

Hereinafter, examples of the present disclosure associated with a method of configuring synchronization signals/broadcast channels by an NR system, and a scheme of indicating information associated with a frame timing (or a frame boundary) which needs to be provided to a terminal during a synchronization procedure, and multiplexing of synchronization signals in a slot are described.

FIG. 1 is a diagram illustrating the configurations of an SS block, an SS burst, and an SS burst set to which the present disclosure is applicable.

At least a PSS/SSS and/or a PBCH may be transmitted within an SS block. Also, other signals may be additionally transmitted together in the SS block. For example, an MRS (Measurement Reference Signal) used for measuring a channel quality for beamforming transmission, TSS (Temporary Synchronization Signal) for indicating a time domain index (e.g., an SS block index or the like), or the like may be multiplexed and transmitted in an SS block.

In a single SS block, an NR-synchronization signal (NR-SS), a broadcast channel, or the like may be allocated to a physical resource according to an FDM (Frequency Division Multiplexing), a TDM (Time Division Multiplexing), or a combination thereof, and may be transmitted to a terminal by a base station.

On or more different beams may be used for SS blocks within at least a SS burst set periodicity, and a beam transmission-based SS block may be transmitted. Particularly, beam transmission-based SS block transmission may be used for compensating for channel attenuation occurring in a high frequency band (e.g., over 6 GHz). Alternatively, in a frequency band other than the high frequency band (e.g., below 6 GHz), uni-beam transmission may be used for SS blocks.

One or more SS blocks may configure a single SS burst. The SS blocks included in the single SS burst may be contiguously or discontiguously allocated in the time or frequency domain.

One or more SS bursts may configure a single SS burst set. From the perspective of a terminal, periodic NR-SS/broadcast channel reception may be expected for each SS burst set periodicity.

During at least the initial cell access for each predetermined frequency band, a terminal may assume a default SS burst transmission periodicity value. In the RRC connected mode or an RRC idle mode, the terminal may receive updated information associated with an SS burst set transmission periodicity from a base station.

Hereinafter, a PBCH (NR-PBCH) defined in the NR system will be described. The SCS for a PBCH may be the same as or different from a default subcarrier spacing (default SCS) which is defined for each frequency range category.

The number (N) of OFDMs included in a single SS block may be one of 2, 3, and 4. N may be determined based on a default SCS. The number of SS blocks in a single SS burst may be 7 or 14. The number of SS bursts in a single SS burst set may be 1, 2, 4, or the like. In this instance, when an NR-PBCH is transmitted in an SS block, the correlation with a frame number needs to be considered.

Also, NR-PBCH transmission in an SS block needs to be defined for a default SS burst set periodicity and for SS burst set periodicities in an RRC Idle/Connected mode.

For example, in frequency range category #1 (e.g., below 6 GHz), an SCS value may be one of 15, 30, and 60 kHz. The minimum NR carrier bandwidth may be one of 5 MHz, 10 MHz, and 20 MHz. The transmission bandwidth of each synchronization signal may be one of approximately 1.08 MHz, 2.16 MHz, 4.32 MHz, and 8.64 MHz.

Also, in frequency range category #2 (e.g., over 6 GHz), an SCS value may be one of 120 kHz and 240 kHz. The minimum NR carrier bandwidth may be one of 20 MHz, 40 MHz, and 80 MHz. The transmission bandwidth of each synchronization signal may be one of approximately 8.64 MHz, 17.28 MHz, 34.56 MHz, and 69.12 MHz.

Also, PSS/SSS allocation in a single SS block may be multiplexed according to the TDM. A PBCH may be multiplexed to SSs (i.e., PSSs/SSSs) according to the TDM, FDM, or a combination thereof.

At least a part of SFN (System Frame Number) information bits is explicitly indicated through control information transmitted via a NR-PBCH, and the remaining part of SFN information bits may be implicitly indicated. For example, 8-bit SFN information, and 18-bit HSFN (Hyper SFN) information may be explicitly transmitted via a PBCH, while the remaining part of SFN information bits may be indicated implicitly or explicitly depending on applied scheme.

Hereinafter, a scheme of implicitly indicating the remaining SFN information for the NR system will be described.

In the NR system, applying multi-beam transmission to synchronization signals, random access signals, and broadcast channels (e.g., NR-PBCH, NR-SIB (System Information Block)) is considered in order to overcome worse channel environment where high pathloss occurring on a high carrier frequency (e.g., over 6 GHz), phase noise, frequency offset, or the like increases.

Multi-beam transmission may be performed when an angular region (i.e., a target coverage area from the perspective of an azimuth and an elevation) where a single TRP (Total Radiated Power) needs to cover different beamformed patterns is significantly large.

In order to support multi-beam transmission, a beam width, the number of beams, or the like may be determined. The values may be variously determined according to the environment of a cell where TRP exists (e.g., a target coverage area, an ISD (Inter-Site Distance), a carrier frequency, or the like). Therefore, for the degree of freedom of implementation, it is required to define the maximum number of physical resources (e.g., SS blocks/SS bursts/SS burst sets), and the maximum number of beams which can be transmitted via the physical resources.

Figure 2:
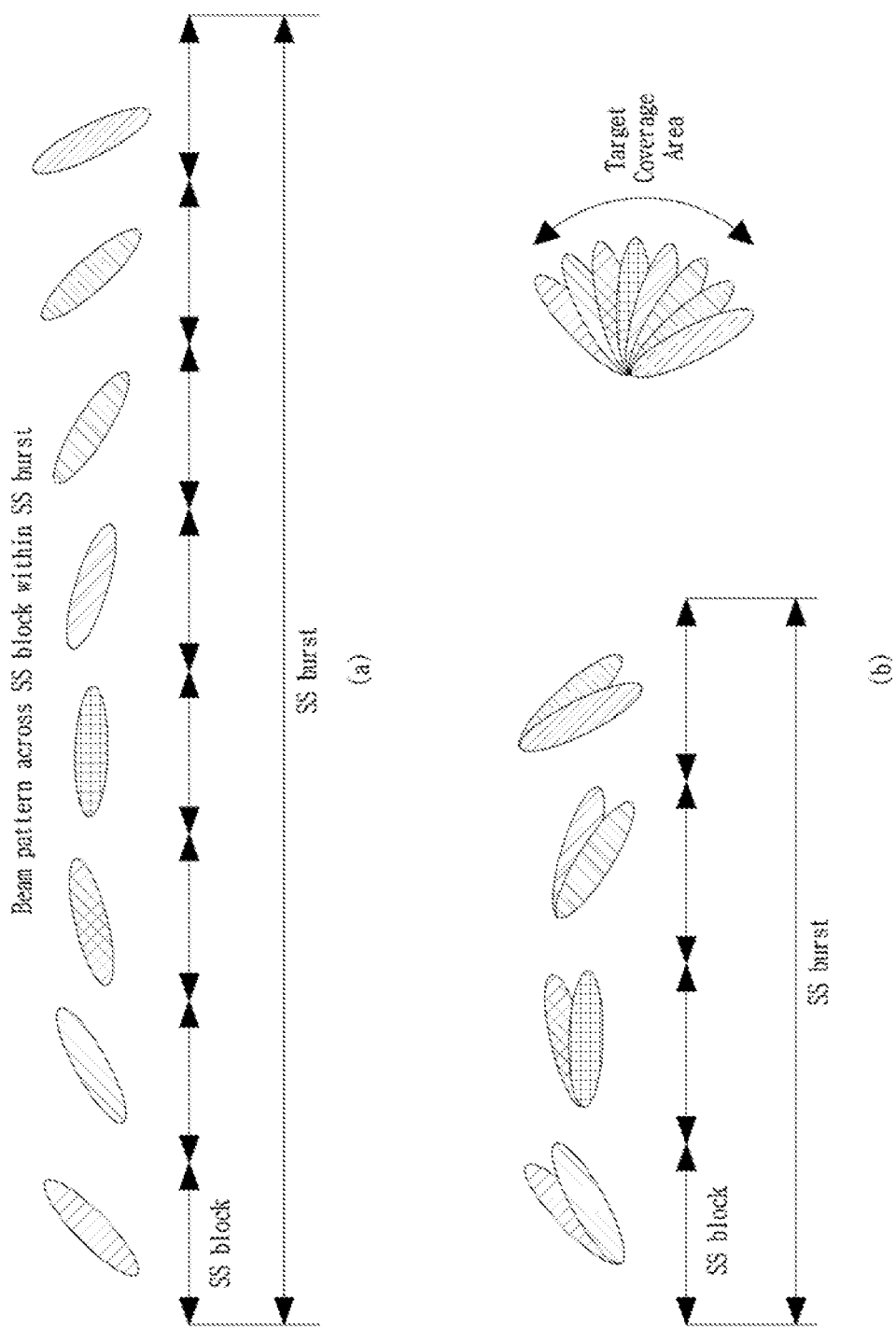
FIG. 2 is a diagram illustrating an example of beam transmission for SS blocks in a SS burst, to which the present disclosure is applicable.

FIG. 2 is a diagram illustrating an example of beam transmission in a SS burst according to the present disclosure.

Part (a) of FIG. 2 shows an example in which a single beam is applied for each single SS block, and the normal analog beamforming method is applied. In this instance, the number of beams to be applied may be limited based on the number of Radio Frequency (RF) chains.

Part (b) of FIG. 2 shows an example in which two beams are applied for each single SS block, and normal digital beamforming method or hybrid beamforming method is applied. In this instance, beam sweeping is available, which is to cover a target coverage area during a short period of time. Therefore, the amount of SS block resources consumed may be smaller than that of the example shown in part (a) of FIG. 2, whereby the efficiency of network resource consumption may be improved.

SS block transmission may not always consider multi-beam transmission, and a signal such as an NR-SS, a PBCH, or the like may be transmitted according to the same transmission structure as in multi-beam transmission, even in a low frequency band (e.g., below 6 GHz).

As illustrated in FIG. 1, in the NR system, it is required to apply one or more beam transmissions to the same SS block. Therefore, SS block transmission in which different beam patterns are applied for each SS block through beam sweeping may be performed to satisfy a target coverage area.

Here, transmission performed to satisfy the target coverage area indicates that each of the one or more beam transmissions is transmitted based on a beam width and/or azimuth intended by a base station, and the one or more beam transmissions cover a predetermined target area overall.

Also, according to determination by an NR base station, a signal, such as an NR-SS, a PBCH, or the like may not be transmitted in all SS blocks.

The present disclosure describes examples of a scheme of scrambling a channel in an SS block including NR-PBCH transmission, based on the above-described NR-SS block and SS burst structure, and additionally describes examples of a scheme of transmitting the remaining SFN information and/or 5-ms SS block transmission interval timing, based thereon.

Figure 3:
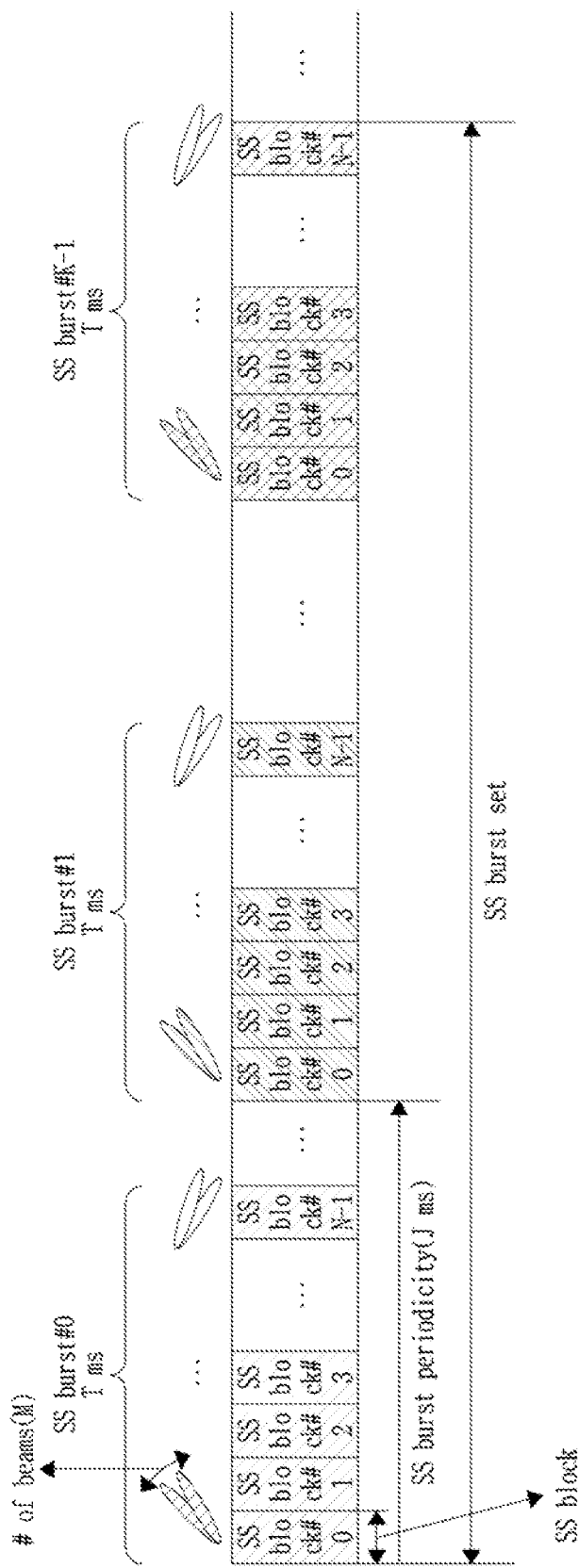
FIG. 3 is a diagram illustrating an example of a SS block transmission structure according to the present disclosure.

FIG. 3 is a diagram illustrating an example of an SS block transmission structure according to the present disclosure.

It is assumed that the number of OFDM symbols for each SS block (# of OFDM symbols per SS block) is N. I may be determined according to a method of multiplexing between a synchronization signal, such as NR-PSS/SSS, NR-TSS, NR-PBCH, MRS, or the like, and a broadcast channel. For example, N may be 1, 2, and 4.

It is assumed that the number of beams for each SS block (# of beams per SS block) is M. M may indicate the maximum number of beams applied to a single SS block, and the number of beams and a beam width may be set by a base station. Therefore, the base station may transmit a maximum number of beams allowed in a single SS block, or may transmit an SS through some beams.

It is assumed that the number of SS blocks for each SS burst (# of SS block per SS burst) is I. The number of SS blocks included in each SS burst may be a fixed I value, or I may vary according to a fixed SS burst duration (T) and the number of OFDM symbols (N) included in a single SS block.

It is assumed that the value of an SS burst duration is T, and the unit thereof may be ms. T may be determined based on at least one of subcarrier spacing (SCS), the number (I) of OFDM symbols included in a single SS block, and the fixed number (N) of SS blocks included in a single SS burst. For example, T may be 1 ms, 2 ms, 4 ms, . . . , or the like.

It is assumed that an SS burst periodicity is J, and the unit thereof may be ms. SS burst may have a predetermined periodicity, and the periodicity may be determined based on requirements associated with a synchronization time or the like. For example, J may be 5 ms, and may not be limited thereto. J may be differently set for each SCS according to an SCS value, an SS transmission structure, or the like.

It is assumed that the number of SS bursts for each SS burst set (# of SS bursts per SS burst set) is K. K may be set to be a fixed value, or may be set by a base station through high layer signaling or the like.

Also, an SS burst set periodicity may be defined. From the perspective of a terminal, when one SS block is successfully detected for at least the initial access, it may be assumed that a periodicity by which a beam pattern same as the beam pattern of the detected SS block is transmitted as an SS burst set periodicity.

Hereinafter, based on the above described SS block transmission structure, a scheme of providing required information to a terminal via an NR synchronization signal and a broadcast channel will be described.

When the number of OFDM symbols included in a single SS block is 1, an NR-SS and an NR-PBCH may be multiplexed according to FDM. When the number of OFDM symbols included in a single SS block is more than one (e.g., N=2, 3 or 4), an NR-SS and an NR-PBCH may be multiplexed through TDM, FDM, or a combination thereof.

It is assumed that a subframe has a time interval of 1 ms. That is, even though SCSs are different from each other, a subframe may be defined as a time reference with a fixed predetermined time interval.

The time duration of one slot may be differently set based on an SCS. For example, the time duration may be listed in Table 1 provided below. In Table 1, for example, one slot has 7 OFDM symbols in case of 15 kHz SCS, but one slot may include 7 or 14 symbols in case of the other SCSs.

TABLE 1

| Subcarrier spacing (kHz) | # of symbols | Time duration per a slot (ms) |
| --- | --- | --- |
| 15 | 7 | 0.5 |
| 30 | 7 | 0.25 |
|  | 14 | 0.5 |
| 60 | 7 | 0.125 |
|  | 14 | 0.25 |
| 120 | 7 | 0.0625 |
|  | 14 | 0.125 |
| 240 | 7 | 0.03125 |
|  | 14 | 0.0625 |
| 480 | 7 | 0.015625 |
|  | 14 | 0.03125 |

The number of slots in one subframe (1 ms) may be different according to an SCS value. Referring to Table 1, when the SCS is 15 kHz, the number of symbols in a single slot may be 7, and the number of slots for each subframe may be 2. In case of 30 kHz SCS, if the number of symbols in a single slot is 7, the number of slots in each subframe may be 4. In case of 60 kHz SCS, if the number of symbols in a single slot is 7, the number of slots in each subframe may be 8.

Therefore, when at least one SS burst time interval is determined to have a predetermined length, and the number of SS blocks may be defined based thereon. Here, the SS burst time interval may be defined based on a slot unit, subframe unit, or time unit (e.g., ms).

For example, in the case of 15 KHz SCS (subcarrier spacing), the SS burst interval may be defined as 1 ms (subframe). If one SS block is allocated on one or two OFDM symbols, 14 or 7 SS blocks (N=14 or 7) may be included in each SS burst. Alternatively, the number of SS blocks included in one SS burst may be always fixed as 14, and the SS burst interval may be greater than or less than 1 ms depending on an SCS value or the number of OFDM symbols included in a single SS block.

Although it is described that the number of SS blocks for each SS burst is 7 or 14, the number of SS blocks may be set as 28, 48, . . . , or the like, depending on SCS (Subcarrier spacing), a beam sweeping time, a SS block structure, or the like.

The number of SS blocks included in the SS burst interval may be determined based on the length of the time interval of an SS block (e.g., 1, 2, or 4 symbols).

When a terminal receives an SS block, the terminal may recognize at least an OFDM symbol timing boundary according to a predetermined SS block structure that includes a predetermined number of OFDM symbols for each SS block. However, even though the terminal receives an SS block, the terminal may not recognize information associated with an SS block index or a symbol index of a corresponding symbol timing, and may not also recognize information associated with a frame timing. Also, in the case in which one or more beams are applied to SS transmission, information associated with the number of beams applied to an SS block may be needed to proceed with initial synchronization, RRM measurement, random access or the like, and thus, beam resource index information may also be required.

The terminal needs to perform an initial cell access procedure including synchronization, system information obtaining, or the like, in order to access an NR system. As described above, in the NR system, a base station transmits a synchronization signal and a broadcast channel to a terminal in order to provide synchronization and system information using an SS block, SS burst, and SS burst set structure. During the process, the terminal may obtain frame boundary timing information.

The terminal may monitor an SS block at least for initial access, based on at least a default subcarrier spacing value.

Here, the default subcarrier spacing may correspond to a numerology value that is assumed by the terminal for each frequency band at least for the purpose of initial cell access. Through the value, the terminal may assume in advance a time-domain resource structure (e.g., an OFDM symbol length, a slot structure, a subframe structure, a radio frame structure, or the like) for receiving NR-SS and PBCH in an SS block. For example, in the frequency band below 6 GHz, one of 15 kHz, 30 kHz, and 60 kHz SCS may be used as a default subcarrier spacing value. In the frequency band over 6 GHz (or 6 to 52.6 GHz), one of 120 kHz and 240 kHz SCS may be determined as the default subcarrier spacing value.

Hereinafter, based on the above-described NR-SS block/SS burst/SS burst set structure, a scrambling scheme for providing inter-cell interference randomization for an NR-PBCH which is transmittable in a single SS block, a scheme of indicating a 5-ms timing, and a scheme of implicitly indicating the remaining SFN value will be described.

For example, although an SFN information has 10 bits, 8 bits of the SFN information may be explicitly indicated to a terminal via an NR-PBCH, and the remaining SFN information, that is, the remaining 2 bits correspond to a value that may be implicitly provided in a physical layer. Alternatively, although the SFN information has 18 bits, 16 bits of the SFN information may be explicitly indicated to a terminal via an NR-PBCH, and the remaining 2 bits correspond to a value that is implicitly provided in a physical layer. The remaining SFN information bits are referred to as a remaining SFN value. Hereinafter, a method of implicitly indicating the remaining SFN information to a terminal in an NR system will be described.

The remaining SFN value is associated with a physical time interval where a single NR-BCH (NR Broadcast Channel corresponding to a NR logical channel) is transmitted. That is, when it is assumed that remaining SFN information is the number of radio frames (=system frames) existing in a physical time interval where a single piece of MIB (Master Information Block) information included in an NR-BCH is transmitted without change in an NR-PBCH. A part of the SFN information associated with the corresponding radio frames may be referred to as a remaining SFN. For example, when the physical time interval during which MIB information included in a PBCH is transmitted without change is 80 ms, 8 radio frames (under assumption that a single radio frame is 10 ms) may exist in the corresponding time interval. Therefore, 8 radio frames may correspond to 0 to 7 system frames, that is, 3 bits as a remaining SFN information. Therefore, when it is assumed that an SFN information bit field is 10 bits in the NR system, 7 bits (i.e., 10-k bits) may be explicitly indicated by MIB included in a PBCH transmitted by a base station, and bit information (k bits) associated with the remaining SFN information may be implicitly indicated according to the method proposed by the present disclosure. Accordingly, the terminal may finally derive and obtain the entire SFN information. In the same manner, when the SFN value is 18 bits, 15 bits are transmitted via the MIB according to the explicit method, and the remaining 3 bits are indicated by a base station to a terminal according to the proposed implicit method.

An SS block time location for each frequency band range may be defined as one set. Such SS block time location (using L SS blocks) may be defined under an SS burst set unit or a radio frame unit, and SS blocks exists on the time axis at predetermined time intervals based on the unit. For example, the time location of SS blocks is determined based on a SS burst set unit or a radio frame unit, and the candidates of the SS block time location may be repeated per every SS burst set unit or radio frame unit in the time-domain.

For example, in the frequency band below 3 GHz, a maximum of 1 to 4 SS blocks may be defined for each SS burst set. In the frequency band ranging from 3 GHz to 6 GHz, a maximum of 4 or 8 SS blocks may be defined for each SS burst set. In the frequency band ranging from 6 GHz to 52.6 GHz, a maximum of 64 SS blocks may be defined for each SS burst set.

All the SS blocks defined as described above may need to be located and performed during a limited 5-ms transmission time in order to minimize the amount of power consumed for receiving SS blocks. Therefore, two types of SS block transmission windows (5 ms) may exist within one radio frame (10 ms) during 80 ms, a terminal needs additional information associated with an SS block transmission window. Therefore, a base station also needs to indicate an SS block transmission window timing (i.e. 5 ms) to the terminal, in addition to the remaining SFN information within 80 ms.

Figure 4:
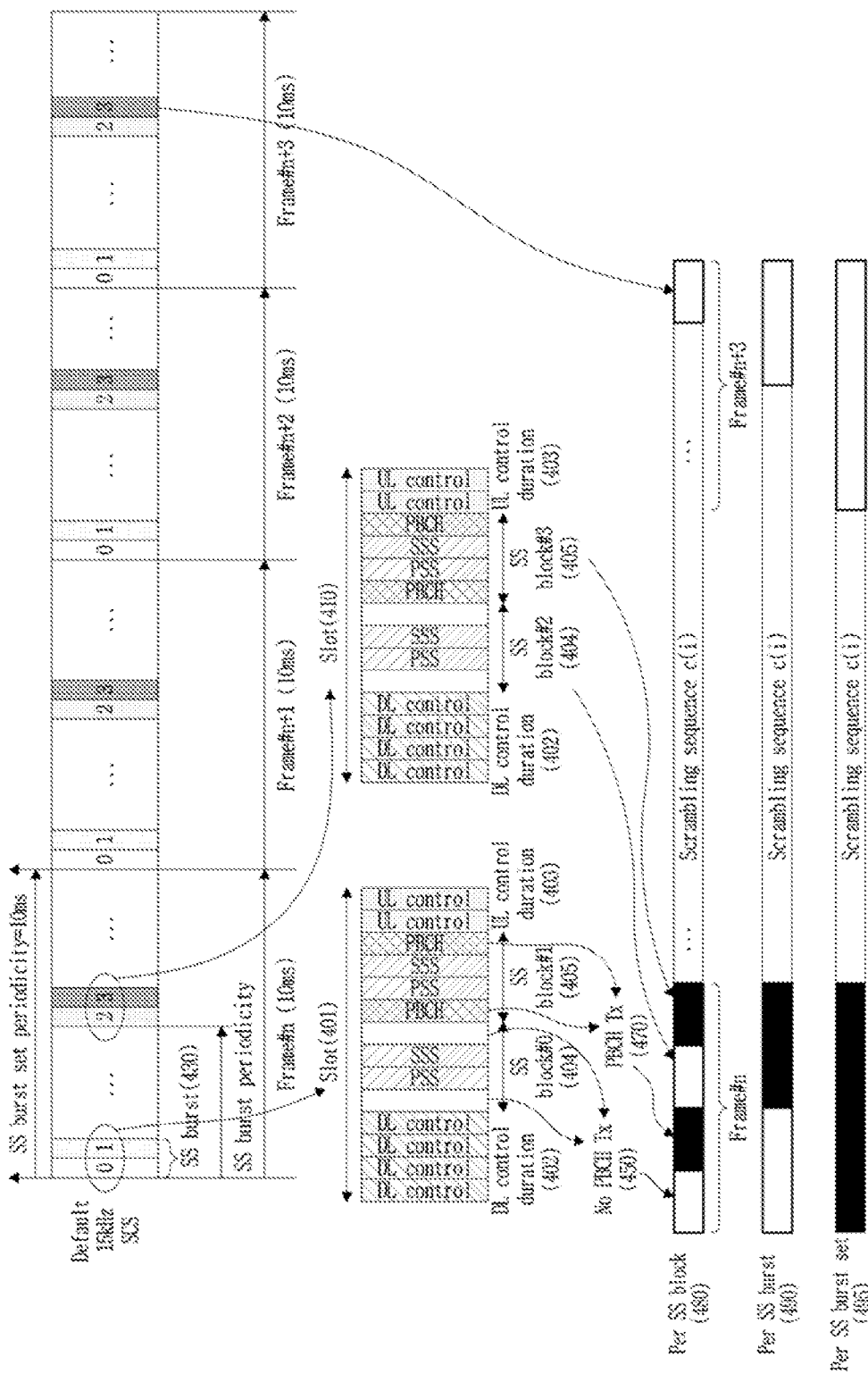
FIGS. 4 and 5 are diagrams illustrating the structures of a SS block, a SS burst, a SS burst set, and a radio frame in the time domain, according to the present disclosure.
Figure 5:
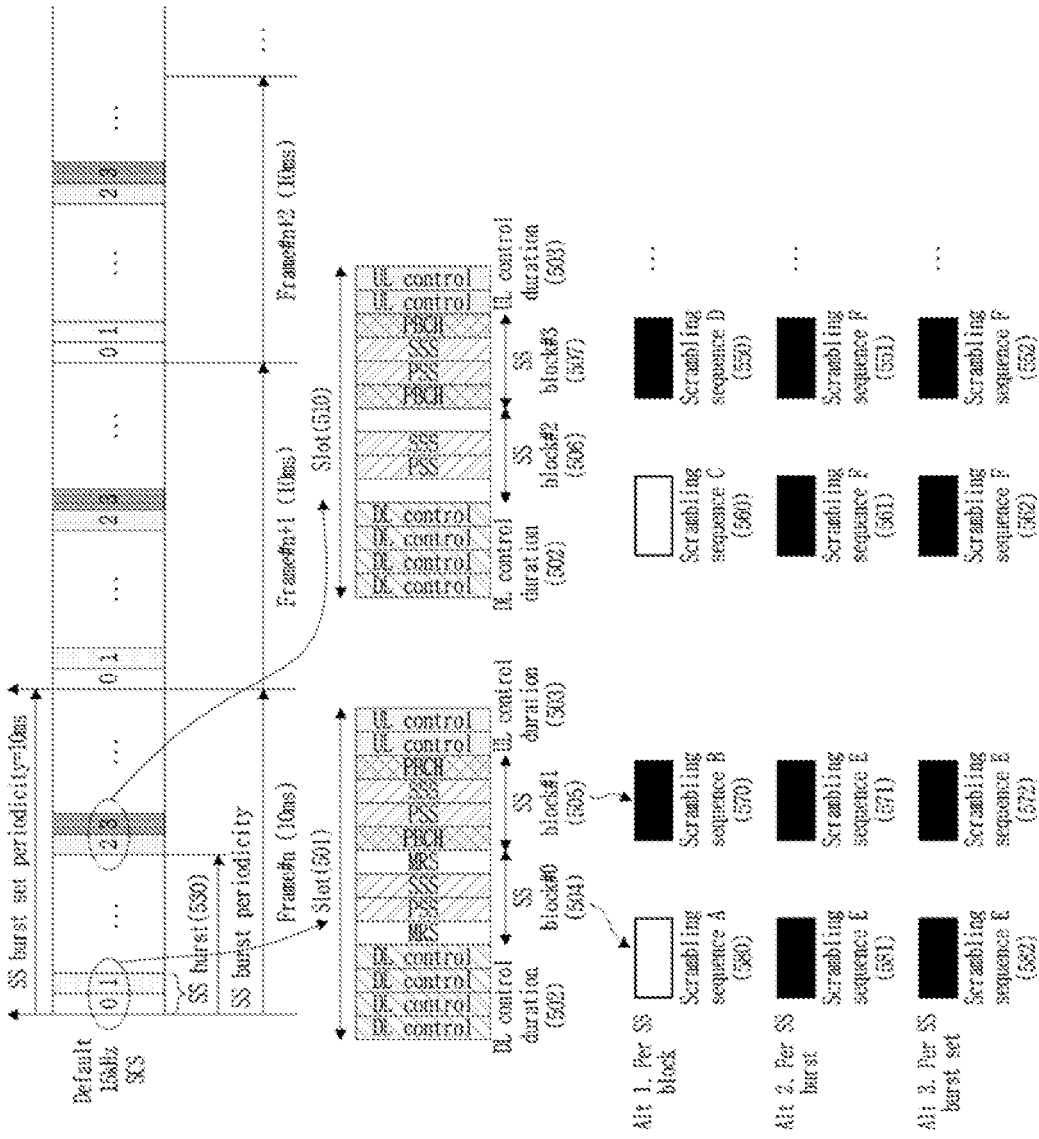

FIGS. 4 and 5 are diagrams illustrating the structures of an SS block, an SS burst, an SS burst set, and a radio frame in the time domain.

For example, referring to FIG. 4, two SS bursts exist in a single SS burst set. Here, although it is described that a time unit in which a SS burst set exists is the same as a radio frame (e.g., 10 ms), a plurality of SS burst sets may be defined in one radio frame or other combinations can be used. Therefore, the present disclosure may not be limited to the above described example.

Figure 8:
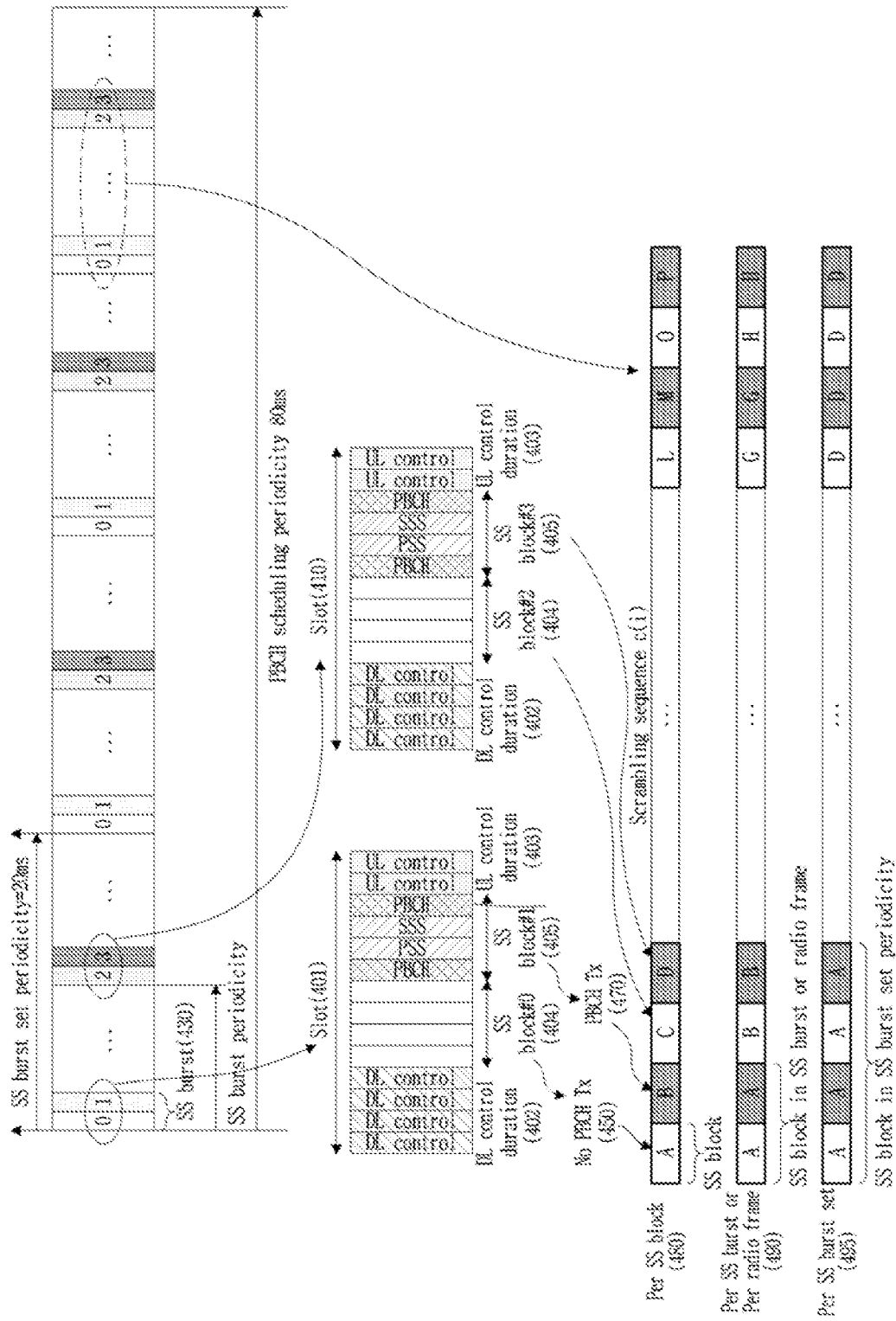
FIGS. 8 and 9 are diagrams illustrating examples of scrambling schemes applicable to the PBCH in a SS block in PBCH scheduling periodicity, according to the present disclosure.

For example, referring to FIG. 8, one SS burst set periodicity may have a time interval of 20 ms, and the SS burst set may include one or more SS bursts and corresponds to two radio frames (10 ms per a radio frame). Therefore, during a "80 ms PBCH scheduling periodicity" which corresponds to a 3-bit remaining SFN time interval (k=3), four SS burst set periodicities may exist. FIG. 8 assumes that the SS burst set includes two SS bursts, and each SS burst includes two SS blocks. As a matter of course, the number of SS bursts and the number of SS blocks in the SS burst set periodicity may be variously changed with the range of L value (i.e., the maximum number of SS block candidates in an SS burst set).

In the present disclosure, a scrambling may be performed according to first NR PBCH scrambling method, and additionally, the scrambling may be differently performed for each SS block during a time interval corresponding to the remaining SFN k bits. A scrambling sequence may be initialized based on at least Cell ID value at the start of the time interval corresponding to the remaining SFN k bits (e.g., k=3, 80 ms, 8 radio frame). The first NR-PBCH scrambling is performed before channel coding, and CRC may be attached after scrambling is performed.

As another example, according to the method proposed below, the scrambling sequence may be initialized at the start of the time interval corresponding to remaining SFN k bits (e.g., k=3, 80 ms, 8 radio frame) by using at least one value from among an SS burst index, an SS block index, an SS burst set index, in addition to the Cell ID.

For example, when the remaining SFN k bit is 2 bits, the scrambling sequence may be initialized every four radio frames as illustrated in FIG. 4. Therefore, a bit-wise scrambling operation is performed with respect to a sequence generated for each interval based on the number of radio frames corresponding to k bits (e.g., k=2 bits, 4 radio frames) and for each SS block in one radio frame in the each interval, and bits (e.g., a information bit) for PBCH transmission. Therefore, in the case of k=2 bits, a scrambling sequence may be generated every four radio frames, based on at least a Cell ID value, and scrambling of PBCH in each SS block may be performed corresponding to PBCH information bits (480).

Although PBCH transmission does not exist in a SS block as shown in the diagram 450, A part of a scrambling sequence corresponding to PBCH information bits in the SS block may be considered as shown in the diagram 480. In other words, although PBCH transmission does not exist in the SS block, a scrambling sequence applies an offset value corresponding to the PBCH information bits, which consider the SS block without PBCH transmission for the subsequent PBCH scrambling. This is to use a part of the scrambling sequence associated with the actual PBCH transmission, for scrambling when subsequent PBCH transmission actually exists.

From the perspective of a terminal, the terminal may not recognize, in advance, an SS block at which PBCH transmission is actually performed by a base station, in a set of SS blocks in the time domain, which is defined for each frequency band (e.g., SS block locations on the time axis, SS blocks 0, 1, 2, and 3 of FIG. 4). That is, an SS block that includes PBCH transmission is not determined in advance in the SS block time location, but may be determined according to setting or implementation by the base station.

According to the scrambling scheme of the present disclosure, scrambling for PBCH transmission is performed using different parts of one scrambling sequence based on an SS block index, an SS burst index, or an SS burst set index in radio frames corresponding to the remaining SFN. Additionally, in order to indicate the remaining SFN value, an SS block index 480, an SS burst index 490, or an SS burst set index 495 which exist in each radio frame may be used.

For example, as illustrated in FIGS. 4 and 8, a scrambling sequence may be initialized every time interval corresponding to the remaining SFN k bits (e.g., k=3, 80 ms, 8 radio frame), and a scrambling sequence (c(i)) is generated based on S, which is the number of potential SS blocks, the number of SS bursts, the number of SS burst sets, the number of slots, or the number of radio frames in the time interval corresponding to the remaining SFN K bits, the number ($S_{SS\_block}$) of potentially transmittable SS blocks in one of the time intervals, and the number ($K_{bit}$) of information bits for PBCH transmission included in one SS block. When a frequency band considered for PBCH transmission is below 6 GHz (L=4 or L=8), 5-ms timing information (1 bit) and 20-ms SFN boundary ($2^{nd}/3^{rd}$ SFN 2 bits) information may be excluded from the PBCH information bit ($K_{bit}$) for the first PBCH scrambling. When the frequency band is over 6 GHz and L=64, 5-ms timing information (1 bit), 20-ms SFN ($2^{nd}/3^{rd}$ SFN 2 bits) information, and 3-bit MSB of SS block index may be excluded from the PBCH information bit ($K_{bit}$) for the first PBCH scrambling. Therefore, the length of the scrambling sequence c(i) may be $S \cdot S_{SS\_block} \cdot K_{bit} = M_{bit}$. For example, a scrambling sequence may be generated as long as a value ($S \cdot S_{SS\_block} \cdot K_{bit} = M_{bit}$) obtained by multiplying S, which is the number of possible SS blocks in a time interval (80 ms) corresponding to the remaining SFN k bits, the number of SS bursts, the number of SS burst set, the number of slots, or the number of radio frames, by the number ($K_{bit}$) of coded bits for one PBCH transmission, and scrambling sequence parts corresponding to an SS block including PBCH transmission from among potentially transmittable SS blocks (e.g., sequence parts B, D, M, P, or the like of "Per SS block 480 of FIG. 8) and PBCH information bit (b(i)) may be scrambled as given in Equation 1.

Here, when a scrambling sequence is generated based on S, which is the number of SS bursts, the number of SS burst sets, the number of slots, or the number of radio frames (i.e. no corresponding to the number of SS blocks), and the number of PBCH information bits $K_{bit}$ as described above, the same part of the scrambling sequence may be applied to the PBCH in potentially transmittable SS blocks in a time interval corresponding to the number of SS burst, the number of SS burst set, the number of slot, or the number of radio frame (e.g., the diagram 490 or 495 of FIG. 4 or FIG. 8). Unlike the method of generating a scrambling sequence based on an SS block unit, when a scrambling sequence is generated based on an SS burst unit, an SS burst set unit, one or more slots, or one or more radio frames (e.g., as shown in the diagrams 490 and 495), the same part of a scrambling sequence is applied to the PBCH in the all SS blocks during the corresponding time unit. Even though scrambling sequences are generated based on different time units, the length $M_{bit}$ of the scrambling sequences are the same. The number of information bits for PBCH transmission included in one SS block may be approximately $K_{bit}$=768 bits (e.g., 24 PRBs, 2 OFDM symbols, 4 DMRS REs per OFDM symbol), and the scrambling sequence length $M_{bit}$ may be determined according to S corresponding to any of the time intervals and $S_{SS\_block}$.

Therefore, a terminal may perform a descrambling process to identify a scrambling sequence part used for PBCH, and may derive an associated radio frame in the remaining SFN information, so as to recognize an SFN.

Among the above proposed methods, a method based on an SS block index will be described as follows. As described above, a method based on an SS burst index or SS burst set index may be applied in the same manner.

Equation 1 provided below shows that scrambling is performed with scrambling sequence ($M_{bit}$) and entire PBCH information bits (b(i)) per a time interval corresponding to the remaining SFN k bits. Here, a scrambling sequence (c(i)) associated with an SS block in which PBCH is not transmitted may not be actually used for subsequent PBCH transmission.

$$\tilde{b}(b(i)+c(i)) \bmod 2 \qquad \text{[Equation 1]}$$

The scrambling sequence (c(i)) is initialized at the start of each radio frame that satisfies $n_f \bmod 2^k = 0$ and $nf = \lfloor n_{SS\text{-}block} J \rfloor$, based on $c_{init} = N_{ID}^{cell}$. Alternatively, as described above, the scrambling sequence (c(i)) may be initialized at the start of each radio frame that satisfies $n_f \bmod 2^k = 0$, based on $c_{init} = N_{ID}^{cell}$ (e.g., initialization for every 8 radio frames when k=3).

Here, J may be defined as the number of SS blocks per radio frame. Also, the value is determined based on a set of SS blocks assumed by a terminal for each frequency band for initial cell access in the time domain. In the above example, J is 4. The number of SS blocks in a single radio frame in the time domain is 4.

The PBCH scrambling sequence c(i) uses, for example, two polynomials $x^{31}+x^3+1$ and $x^{31}+x^3+x^2+1+1$ based on a Gold sequence having a length of 31. As the initial value of the polynomials, a fixed "000 . . . 001" value (a length of 31) is used for the first polynomial, a Cell ID, and/or different time information (SS block indices 2 to 3 and/or an OFDM symbol index) may be used for the second polynomial. The sequence (c(i)) generated as described above may be used for scrambling PBCH data (b(i)). Gold sequences having different lengths for accommodating a larger number of initial values or Gold sequences generated by applying different polynomials may be utilized for the purpose of indicating a timing boundary (e.g. SFN, 5 ms timing and SS block index) proposed by the present disclosure.

Also, $n_{SS\text{-}block}$ is an index for SS blocks allocated in remaining SFNs determined by $2^k$. The range of the SS block indices may be determined by using a combination of SS burst sets, or a combination of SS bursts and an SS block index in the remaining SFN. In the above example, four radio frames correspond to remaining SFNs, and the range of SS block index $n_{SS\text{-}block}$ have 0 to 15 within the total number of SS blocks (i.e., 16 SS blocks) existing in the four radio frames.

Table 2 provided below shows an example of performing scrambling for each SS block in remaining radio frames. Table 3 shows an example of performing scrambling for each SS burst in remaining radio frames.

As shown in Table 2, it is described that the method performs scrambling for every SS block index in each SS burst set. Additionally, as shown in Table 3, the method may be applied to the example in which scrambling is performed for SS blocks (i.e. PBCH) in every SS burst in an SS burst set. That is, a base station performs scrambling for SS blocks (i.e. PBCH) in every SS burst index/SS burst set index in a radio frame corresponding to a remaining SFN, and transmits the same. A terminal may recognize a radio frame index value based on the relationship between a detected SS burst index/SS burst set index, and radio frames corresponding to the remaining SFN.

At least SS block index (504, 505, 506, and 507 in FIG. 5) and information associated with a frame boundary may be obtained through a signal within on SS block, such as an NR-SS, a TSS, an NR-PBCH, or the like.

The method may initialize a scrambling sequence for PBCH scrambling corresponding to each SS block index, each SS burst index, or each SS burst set, using a Cell ID in radio frames corresponding to remaining SFN information (e.g., k=2 bits, 4 radio frame (0~3)). Through the above, the terminal may obtain interference randomization effect for PBCH. In order to indicate an index value corresponding to each frame in the remaining SFN information, a base station performs scrambling in consideration of $n_f \bmod 2^k$ and transmits a PBCH in an SS block to terminals. The terminal performs blind decoding by descrambling the received PBCH. Here, the terminal may readily obtain the corresponding remaining SFN value by performing descrambling and CRC (Cyclic Redundancy Check) check.

Equation 2 provided below shows that scrambling is performed for the number $M_{bit}$ of information bits (b(i)) transmitted in a PBCH in one SS block. Here, a scrambling sequence (c(i)) for an SS block in which PBCH is not transmitted may not be actually used for subsequent PBCH transmission. $M_{bit}$ corresponds to the length of a scrambling sequence and PBCH information bit.

$$\tilde{b}(i)=(b(i)+c(i)) \bmod 2 \qquad \text{[Equation 2]}$$

The scrambling sequence c(i) is initialized for each SS block based on $c_{init}=(n_f \bmod 2^k)2^9+N_{ID}^{cell}$.

A terminal derives an index of an SS block from among the previously determined time locations of SS blocks, and may recognize the time location of the detected SS block in a given SS burst set. Here, it is assumed that the relationship

TABLE 2

| Remaining Radio frame index (e.g. k = 2 bits) | SS block index within a radio frame | SS block index within a SS burst | SS burst within a SS burst set |
|---|---|---|---|
| N | 0, 1, 2, 3 | SS burst #0 = {0, 1}, SS burst #1 = {2, 3} | SS burst set #0 = {SS burst #0, 1} |
| N + 1 | 4, 5, 6, 7 | SS burst #0 = {4, 5}, SS burst #1 = {6, 7} | SS burst set #1 = {SS burst #0, 1} |
| N + 2 | 8, 9, 10, 11 | SS burst #0 = {8, 9}, SS burst #1 = {10, 11} | SS burst set #2 = {SS burst #0, 1} |
| N + 3 | 12, 13, 14, 15 | SS burst #0 = {12, 13}, SS burst #1 = {14, 15} | SS burst set #3 = {SS burst #0, 1} |

TABLE 3

| Remaining Radio frame index (e.g. k = 2 bits) | SS block index within a SS burst | SS burst within a SS burst set |
|---|---|---|
| N | SS burst #0 = {0, 1}, SS burst #1 = {0, 1} | SS burst set #0 = {SS burst #0, 1} |
| N + 1 | SS burst #0 = {0, 1}, SS burst #1 = {0, 1} | SS burst set #1 = {SS burst #0, 1} |
| N + 2 | SS burst #0 = {0, 1}, SS burst #1 = {0, 1} | SS burst set #2 = {SS burst #0, 1} |
| N + 3 | SS burst #0 = {0, 1}, SS burst #1 = {0, 1} | SS burst set #3 = {SS burst #0, 1} |

Referring to the example of FIG. 5, a scrambling sequence is initialized for each SS block, SS block burst, or SS burst set, and a remaining SFN value is implicitly indicated to a terminal. Hereinafter, a method of initializing a scrambling sequence for each SS block index or each SS block burst.

between an SS burst set and a radio frame is determined in advance. For example, as shown in the above described examples, the SS burst set may have a periodicity of 10 ms, and includes a total of 4 SS blocks. The configuration of the SS burst set may be defined for each radio frame. In the above described example, the time interval of the SS burst set and the time interval of the radio frame are the same, and thus, it is recognized that they are in a 1:1 relationship. When two SS burst sets are located in one radio frame, the relationship between the radio frame and the SS burst set may be a 1:2 relationship. As described above, when the relationship between the radio frame and at least one SS burst set is determined in advance, the terminal may derive the relationship between the radio frame and a received SS block based on received SS block index information, and may recognize a corresponding radio frame in remaining SFN information, through a descrambling operation for decoding a PBCH in the received SS block.

In addition, a remaining SFN value may be indicated via a combination of CRC masking of an NR-PBCH and PBCH scrambling in above.

In the NR system, at least one RS from among a DMRS (Demodulation RS), an NR-SSS, and an NR-TSS may be used for decoding at least a PBCH. Like the LTE system, the NR system needs to support space diversity. To this end, the terminal needs to know at least the number of antenna ports of an RS for decoding a corresponding PBCH. In the LTE system, a PBCH is decoded based on a CRS. In the case of the number of CRS antenna ports, a base station performs scrambling or masking on a CRC in the PBCH using different scrambling sequences, and transmits the same to terminals. The terminal may identify the number of CRC antenna port by performing blind decoding with respect to the scrambled information in the CRC.

In the NR system, the number of antenna ports for decoding a PBCH may be a fixed value. Therefore, at least a remaining SFN value is indicated through CRC masking instead of scrambling, however, scrambling may be performed in order to provide the inter-cell interference randomization effect when a PBCH is received.

A CRC bit having a length of 16 is added to an information bit $a_0, a_1, a_2, a_3, \ldots, a_{A-1}$ which is transmitted in a single PBCH. In this instance, a PBCH CRC mask value in Table 4 may be scrambled with a CRC bit and may be transmitted in order to indicate a remaining SFN value. Depending on the range of a remaining SFN value, the range of the "remaining SFN" may be differently defined, and associated RBCH CRC mask bits may be accordingly defined as sequences to be orthogonal to each other. Table 4 provided below shows an example of CRC masking for informing a remaining SFN value by a PBCH.

$c_k = a_k$ for $k=0,1,2,\ldots,A-1$ $c_k = (p_{k-A} + x_{ant,k-A}) \bmod 2$ for $k=A, A+1, A+2, \ldots, A+15$     [Equation 3]

TABLE 4

| Number of remaining SFN (e.g. k = 2 bits) | PBCH CRC mask $<x_{ant,\,0},\,x_{ant,\,1},\,\ldots,\,x_{ant,\,15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |
| 2 | <0, 1, 0, 1, 0, 1, 0, 1, 0, 1, 0, 1, 0, 1, 0, 1> |
| 3 | <1, 0, 1, 0, 1, 0, 1, 0, 1, 0, 1, 0, 1, 0, 1, 0> |

From the perspective of a terminal, as described above, when an SS block corresponding to a predetermined time index is received in predetermined time locations of SS blocks, the terminal may derive a corresponding SS block index by receiving a signal in the SS block, such as a PSS, an SSS, a TSS, a PBCH, or the like. The derived SS block index may provide information associated with the physical time location in a radio frame or an SS burst set to the terminal, and the remaining SFN value may be obtained by performing blind-decoding of the PBCH CRC masking information.

In addition, a part of the remaining SFN values may be indicated by the proposed PBCH CRC mask, and the other part in the remaining SFN values may be indicated through the above described scrambling. This is regarded as a combination of the above described schemes.

Figure 6:
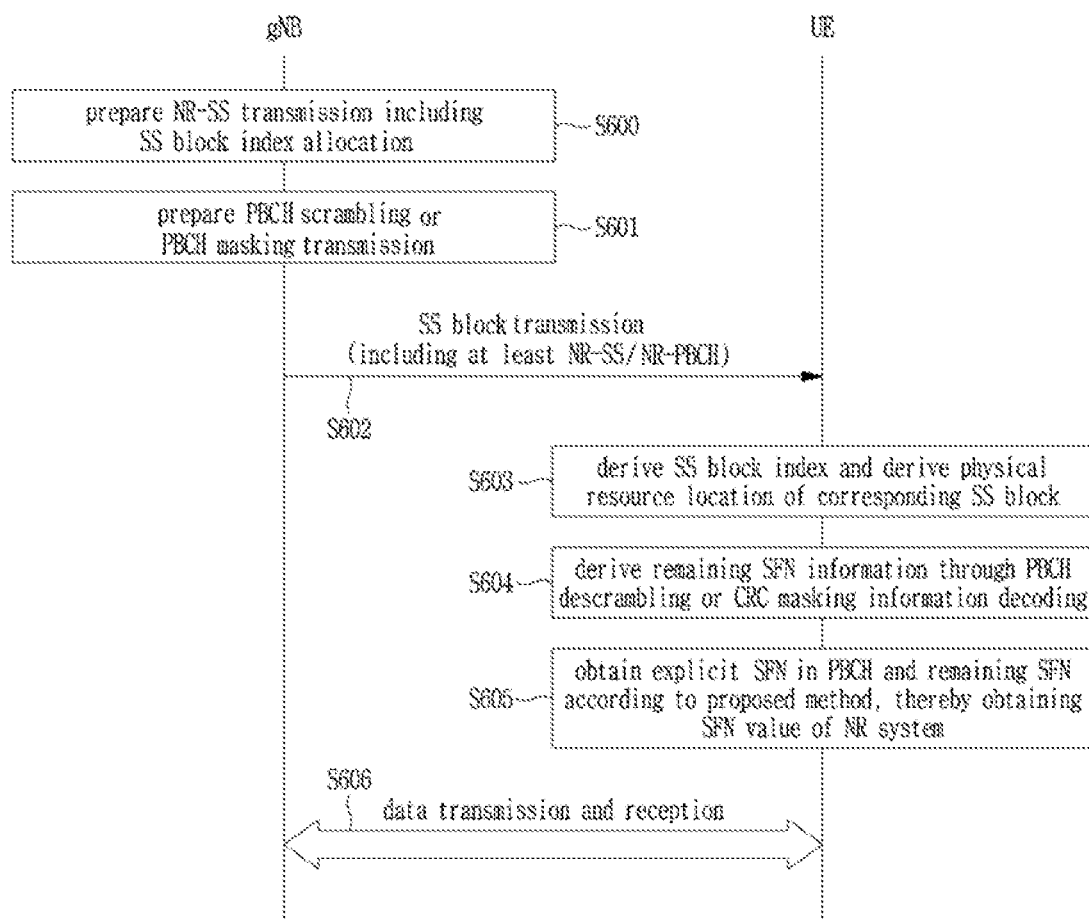
FIG. 6 is a diagram illustrating a signaling procedure according to the present disclosure.

FIG. 6 is a diagram illustrating a signaling procedure according to the present disclosure.

A base station recognize SS block indices within a SS burst set or within a SS burst, based on an SS burst/SS burst set configuration. The base station prepares at least NR-SS/NR-PBCH transmission for each SS block in operation (600).

The base station additionally prepares PBCH transmission together with the NR-SS within the SS block that is determined for SS block transmission by the base station. In operation (601), the base station prepares PBCH transmission to which proposed remaining SFN indication for the PBCH transmission and/or a PBCH scrambling procedure or PBCH masking procedure is applied. In operation (602), the base station transmits prepared SS blocks at predetermined time locations. Here, an SS block may include an NR-SS/NR-PBCH. An MRS (Measurement RS) for measuring a channel and a TSS (ternary SS) for indicating an SS block index may be transmitted selectively or together with an NR-SS and NR-PBCH in an SS block.

In operation 603, a terminal derives an SS block index through the NR-SS/TSS/PBCH in the received SS block, and derives a physical time location through the SS block index value and the predetermined physical location of the SS block index value.

In operation 604, the terminal may derive remaining SFN information by performing a proposed PBCH descrambling procedure or CRC demasking procedure through the PBCH in the received SS block.

In operation 605, the terminal may obtain SFN bits which have been explicitly provided through payload included in the received PBCH, and may obtain remaining SFN information which has been provided according to the above proposed implicit method, thereby obtaining an entire SFN information (i.e. 10 bits) of the NR system. If the proposed implicit indication methods for the remaining SFNs are not considered for NR, then all the SFN information (10 bits) including remaining SFNs for NR system should be explicitly indicated through PBCH payload (i.e. PBCH information bits). In this case, the proposed scrambling methods can only provide interference randomization effect for better PBCH detection performance in a terminal side.

Subsequently, the terminal may perform a data transmission and reception procedure based on received radio frame information (i.e. SFN) of the NR system in operation (606).

Figure 7:
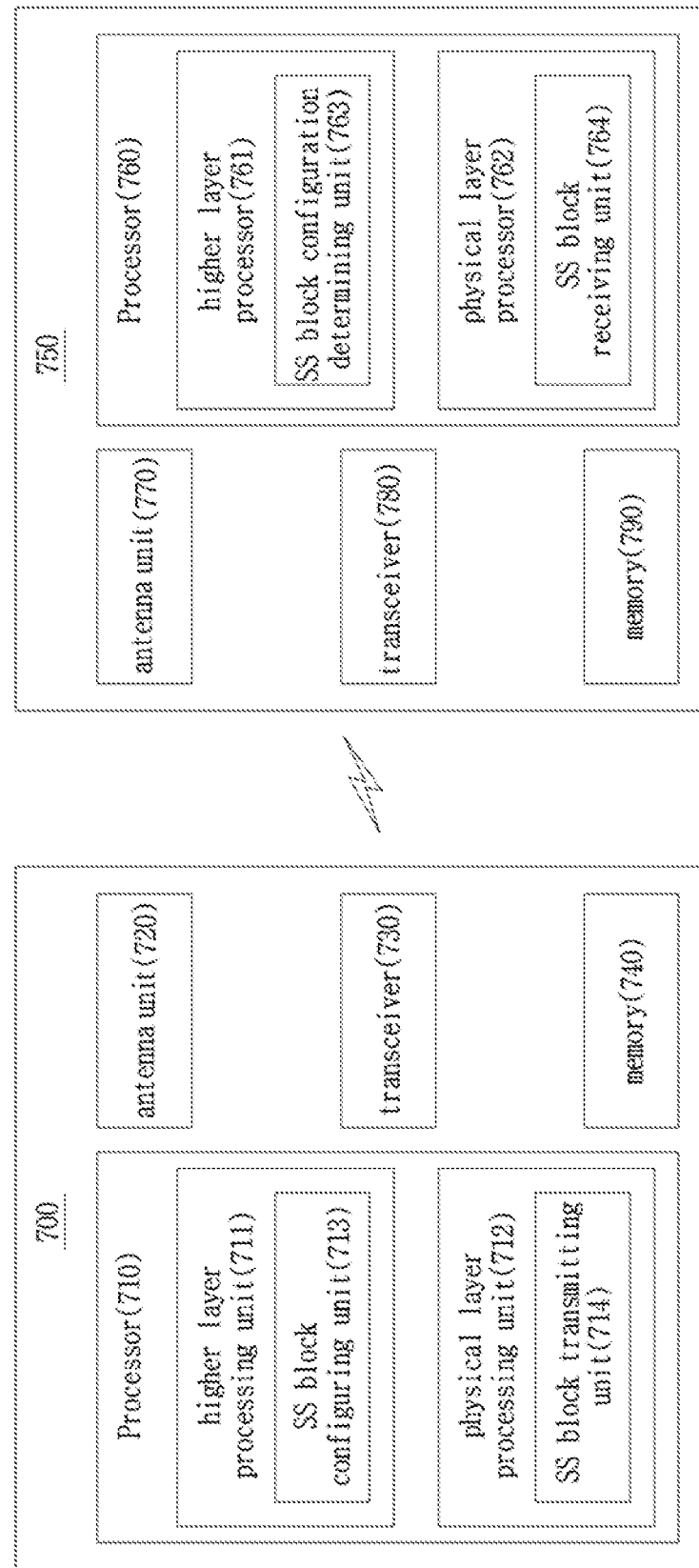
FIG. 7 is a diagram illustrating the configuration of a wireless device according to the present disclosure.

FIG. 7 is a diagram illustrating the configuration of a radio device according to the present disclosure.

FIG. 7 illustrates a base station device 700 for transmitting a synchronization signal and a broadcast channel signal, and a terminal device 750 for receiving a synchronization signal and a broadcast channel signal.

The base station device 700 may include a processor 710, an antenna unit 720, a transceiver 730, and a memory 740.

The processor 710 may perform base band-related signal processing, and may include a higher layer processing unit 711 and a physical layer processing unit 712. The higher layer processing unit 711 may process operation of a MAC layer, an RRC layer, or a higher layer. The physical layer processing unit 712 may process operation of a PHY layer (e.g., downlink transmission signal processing and uplink reception signal processing). The processor 710 may control operation of the base station device 700, in addition to performing baseband-related signal processing.

The antenna unit 720 may include one or more physical antennas, and may support MIMO transmission and reception when a plurality of antennas is included. The transceiver 730 may include an RF transmitter and an RF receiver. The memory 740 may store processed information of the processor 710, software associated with operation of the base station device 700, an operating system, applications or the like, and may include elements such as a buffer or the like.

The processor 710 of the base station device 700 may be configured to implement operation of the base station described in the embodiments of the present disclosure.

The higher layer processing unit 711 of the processor 710 may include an SS block configuring unit 713. The SS block configuring unit 713 may determine the relationship from the perspective of physical resources between a radio frame and an SS block/SS burst/SS burst set configuration, a default SCS, a default SS burst set periodicity, a default slot structure, or the like, which is predetermined for each frequency band, and may provide the same to the terminal device 750 through higher layer signaling or the like. Also, the SS block configuring unit 713 may determine how many bits from among the entire SFN information is to be explicitly signaled (i.e., how many bits is remaining SFN information which is implicitly indicated) in an NR-SS/NR-PBCH, or the like transmitted in an SS block, and may determine a scrambling scheme or a CRC masking scheme applied to the NR-PBCH transmitted in the SS block.

The physical layer processing unit 712 in the processor 710 of the base station device may include an SS block transmitting unit 714. The SS block transmitting unit 714 may configure an SS block based on configuration information set by the SS block configuring unit 713 and may transmit the same. Accordingly, a part of the SFN information may be explicitly indicated to the terminal device 750 through an NR-SS/NR-PBCH of the SS block. Also, the SS block transmitting unit 714 may implicitly indicate the remaining part of the SFN information to the terminal 750 by applying a PBCH scrambling scheme or CRC masking scheme which is associated with SS block transmission.

The terminal 750 may include a processor 760, an antenna unit 770, a transceiver 770, and a memory 790.

The processor 760 may perform base band-related signal processing, and may include an higher layer processing unit 761 and a physical layer processing unit 762. The higher layer processing unit 761 may process operation of a MAC (Medium Access Control) layer, an RRC (Radio Resource Control), or a higher layer. The physical layer processing unit 762 may process operation of a physical (PHY) layer (e.g., uplink transmission signal processing and downlink reception signal processing). The processor 760 may control operation of the terminal device 750, in addition to performing baseband-related signal processing.

The antenna unit 770 may include one or more physical antennas, and may support MIMO (Multiple Input Multiple Output) transmission and reception when a plurality of antennas is included. The transceiver 770 may include an radio frequency (RF) transmitter and an RF receiver. The memory 790 may store processed information of the processor 760, software associated with operation of the terminal device 750, an operating system, applications, or the like, and may include elements such as a buffer or the like.

The processor 760 of the terminal device 750 may be configured to implement operation of the terminal device described in the embodiments of the present disclosure.

The higher layer processing unit 760 of the processor 760 may include an SS block configuration determining unit 763. The SS block configuration determining unit 763 may determine the relationship from the perspective of physical resources between a radio frame and an SS block/SS burst/SS burst set configuration, a default SCS, a default SS burst set periodicity, a default slot structure, or the like, which is predetermined for each frequency band, and may provide the information to the physical layer processing unit 762, whereby the physical layer processing unit 762 may detect an SS block. Also, the SS block configuration determining unit 863 may determine how many bits from among the entire SFN information is to be explicitly signaled (i.e., how many bits is remaining SFN information which is implicitly indicated) in an NR-SS/NR-PBCH, or the like transmitted in an SS block, may determine a scrambling scheme or a CRC masking scheme applied to the NR-PBCH transmitted in the SS block, and may transmit the same to the physical layer processing unit 762.

The physical layer processing unit 762 in the processor 760 of the terminal device may include an SS block receiving unit 764. The SS block transmitting unit 764 may attempt reception of an SS block based on information provided by the SS block configuration determining unit 763. Accordingly, the terminal device 750 may explicitly determine a part of the SFN information through an NR-SS/NR-PBCH of the SS block. Also, the SS block receiving unit 764 may implicitly determine the remaining part of the SFN information by identifying a PBCH scrambling scheme or CRC masking scheme which is associated with SS block transmission.

As an additional embodiment, when it is assumed that remaining SFN value is corresponding to k=3 bits (i.e. 8 radio frames (radio subframes 0 to 7)), and a SS burst set is 20 ms, four SS burst sets may exist during 80 ms (=8 radio frame). As described above, the maximum number of SS blocks for each SS burst set may be defined as L for each frequency band. A base station may perform scrambling in the same manner as the scheme of FIGS. 4 and 8, for each SS block, SS burst, SS burst set, or one or more slots within 80 ms, in order to implicitly indicate a remaining SFN value (if applied) and provide interference randomization effects to a terminal. The length of the scrambling sequence c(i) may be $(S*S_{SS\_block}*Kbit=M_{bit})$ as described above. The scrambling sequence (c(i)) may be initialized at a radio frame that satisfies $n_f \bmod 2^k=0$, based on $c_{init}=N_{ID}^{cell}$ as given in Equation 1, for every 8 radio frames (i.e., k=3). As illustrated in FIGS. 4 and 8, when scrambling is performed based on an SS burst set unit, the complexity of a descrambling operation by a terminal may be reduced than when scrambling is performed based on an SS block/SS burst unit. Therefore, when scrambling is performed based on an SS burst set unit, a different part of a scrambling sequence may be utilized for each 20 ms (=SS burst set periodicity) during 80 ms to perform scrambling. Therefore, a scrambling sequence length $M_{bit}$ may be applied for PBCH in SS blocks for every 80 ms.

The processor 710 of the base station 700 may process a first PBCH scrambling and a second PBCH scrambling. The first PBCH scrambling may be performed before performing a channel coding and a CRC addition. The second PBCH scrambling may be performed after performing the channel coding.

Depending on a frequency range in an NR system, a maximum number of SS blocks in an SS burst set periodicity may be defined. For example, the SS burst set periodicity may be 20 ms and the maximum number of SS blocks L in the 20 ms may be 4, 8 or 64 depending on a frequency range in an NR system. In each SS block, a PBCH may be transmitted.

A length-31 Gold sequence generator may be used to generate a scrambling sequence for the first PBCH scrambling. A cell ID of the base station may be used for an initialization value of the length-31 Gold sequence generator and the initialization of the length-31 Gold sequence generator may be performed every 80 ms (i.e., every 8 system frames). For example, the initialization may be performed when the system frame number is zero or a multiple of eight.

The first PBCH scrambling may scramble a partial portion of a payload of a PBCH. For example, when L=4 or 8, 3 bits of the payload may not be scrambled. The 3 bits may include a 1-bit indicating a half radio frame index and 2nd and 3rd least significant bits of a system frame number. Other portions of the payload of the PBCH other than the 3 bits may be scrambled during the first PBCH scrambling. When L=64, 6 bits of the payload may not be scrambled. The 6 bits may include most significant block of SS block index (3 bits), a 1-bit indicating a half radio frame index, 2nd and 3rd least significant bits of a system frame number.

Once the initialization of the scrambling sequence generation is determined for PBCHs in a 80 ms, four 20 ms durations in the 80 ms may be applied with four different scrambling sequence parts. For example, four different values may be respectively applied to the four 20 ms durations, and the four different values may be derived from the 2nd and 3rd least significant bits of the system frame number (e.g., v=0 based on 2nd and 3rd least significant bits=(0,0), v=1 based on 2nd and 3rd least significant bits=(1,0), v=2 based on 2nd and 3rd least significant bits=(0,1), and v=3 based on 2nd and 3rd least significant bits=(1,1)). Based on different v values, four different scrambling sequences may be applied for the four 20 ms durations. However, PBCHs in anyone of the four 20 ms durations may be applied with the same scrambling sequence because the v value is the same within one of the four 20 ms.

The base station 700 may transmit, to the terminal 750, system frame number information via a 10-bit SFN field in a PBCH payload. The base station 700 may also transmit 1-bit information indicating the half radio frame index via the PBCH payload. For example, if the 1-bit information is zero, it may indicate the beginning 5 ms of a radio frame. If the 1-bit information is one, it may indicate the latter 5 ms of the radio frame.

The base station 700 may transmit, to the terminal 750, information of the half radio frame index via a PBCH DMRS sequence. For example, the 1-bit information of the half radio frame index (in addition to the Cell ID and the 2nd and 3rd LSB of SS block index) may be used for an initialization value of a Gold sequence for generating the PBCH DMRS sequence. The 2nd and $3^{rd}$ LSB of SS block index may be transmitted to the terminal 750 via an initialization of the DMRS sequence. The initialization of the DMRS sequence may be performed at the start of each SS block occasion.

Figure 10:
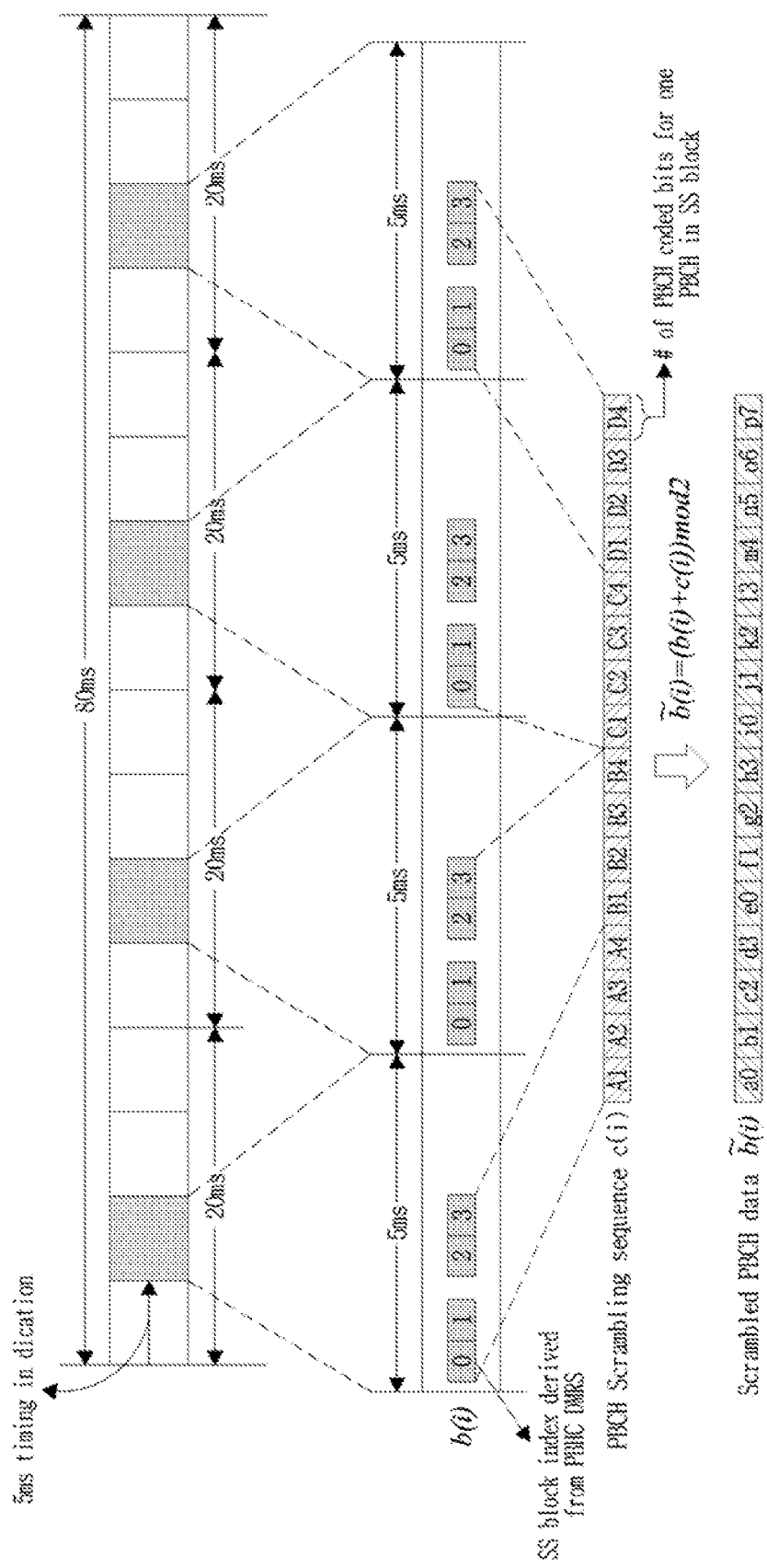
FIG. 10 is a diagram illustrating an example of scrambling scheme applicable to the PBCH based on up to 4 SS block indices in PBCH scheduling periodicity, according to the present disclosure.
Figure 11:
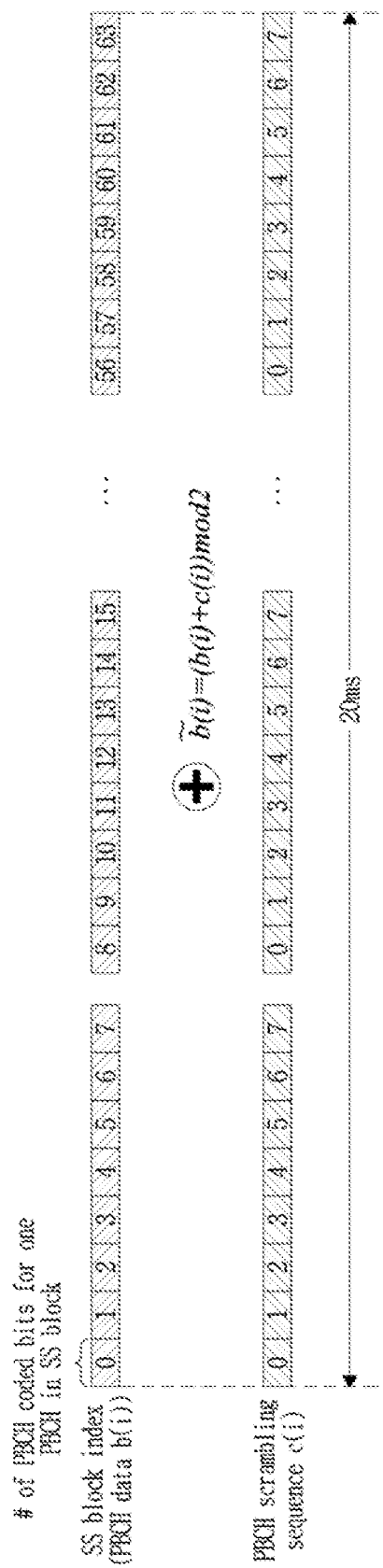
FIG. 11 is a diagram illustrating an example of scrambling scheme applicable to the PBCH based up to 64 SS block indices in PBCH scheduling periodicity, according to the present disclosure.

The second PBCH scrambling described above may be performed to enhance the scrambling performance. Because the same scrambling sequence part is applied within one of the four 20 ms durations, the additional second PBCH scrambling may be performed in each of the four 20 ms durations. For example, via the PBCH DMRS, a 2-bit (L=4) or a 3-bit (L=8 or 64) SS block index may be obtained, and the 2-bit or 3-bit SS block index may be used to determine a different scrambling sequence parts for different SS blocks within one of the four 20 ms. FIG. 10 shows an example of the second PBCH scrambling when L=4. FIG. 11 shows an example of the second PBCH scrambling when L=64. When L=64, the 3-bit SS block index has only eight different values. To apply different second scrambling sequence parts for 64 SS blocks within one of the four 20 ms durations, the eight values indicated by the 3-bit SS block index may be repeated 8 times as shown in Table 8 below.

In an SS burst periodicity in which the maximum number of SS blocks is L, the second scrambling sequence may be initialized at the start of each SS block or the first SS block in each SS burst set. The initialization of the second scrambling sequence may be based on Cell ID of the base station 700.

The base station 700 may initialize, based on a cell identifier of a base station, a scrambling sequence generator to scramble a portion of each PBCH in eight consecutive radio frames, wherein each radio frame in the eight consecutive radio frames has a duration of 10 ms. The base station 700 may determine a plurality of synchronization signal (SS) blocks in the eight consecutive radio frames, wherein each SS block comprises a PBCH, and generate a scrambling sequence to scramble a portion of each PBCH within the eight consecutive radio frames, wherein the scrambling sequence comprises four different sequence parts. The base station 700 may scramble PBCHs in a first 20 ms of the eight consecutive radio frames by applying a first one of the four different sequence part, scramble PBCHs in a second 20 ms of the eight consecutive radio frames by applying a second one of the four different sequence part, scramble PBCHs in a third 20 ms of the eight consecutive radio frames by applying a third one of the four different sequence part, and scramble PBCHs in a fourth 20 ms of the eight consecutive radio frames by applying a fourth one of the four different sequence part.

The base station may determine, based on a frequency range, a maximum quantity of SS blocks associated with the eight consecutive radio frames. The maximum quantity of SS blocks within one of the four 20 ms is 4, 8, or 64 depending on the frequency range. The base station 700 may receive a PBCH demodulation reference signal (DMRS) indicating second and third lest significant bits of an SS block index. The base station 700 may perform, based on the second and third least significant bits of the SS block index, a second scrambling on the PBCHs in one of the first 20 ms, the second 20 ms, the third 20 ms, and the fourth 20 ms.

The base station 700 may indicate, via one or more system frame number (SFN) fields associated with a PBCH, at least one of 1024 radio frame numbers. The base station 700 may indicate, based on the one or more SFN fields, four 20 ms durations in the eight consecutive radio frames. The base station 700 may indicate, based on a 5 ms timing field of a PBCH payload, a 5 ms transmission duration within the eight consecutive radio frames. The base station 700 may transmit, SS blocks in the 5 ms transmission duration within the eight consecutive radio frames. The base station 700 may indicate, based on a PBCH demodulation reference signal (DMRS) sequence generation, the 5 ms timing field.

Figure 9:
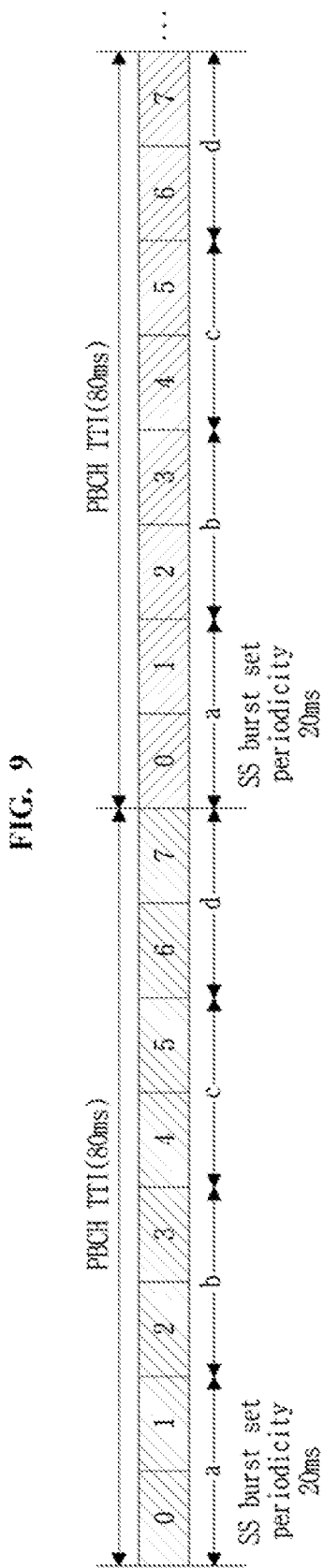

A terminal identifies the above described scrambling scheme (as an example, a different part of a scrambling sequence is applied for each SS burst set periodicity of 20 ms in a time interval of 80 ms (in the same manner as operation 495 of FIG. 4 and FIG. 8, a different part of a scrambling sequence (e.g., a, b, c, or d) is applied for each SS burst set, and in the same manner as FIG. 9, a different part of a scrambling sequence is applied for each SS burst set)). Also, the terminal detects a PBCH in an SS block, and obtains information associated with a time interval where a PBCH exists from among four time intervals of 20 ms (e.g., a, b, c, and d time intervals) within 80 ms based on scrambling information if the proposed implicit remaining SFN indication is applied. As illustrated in FIG. 9, for example, when the parts of the scrambling sequence respectively applied to the time intervals of 20 ms are referred to as a, b, c, and d, the terminal may identify a time interval where a PBCH detected through a descrambling process exists from among a, b, c, and d time intervals, through a decoding process. Each time interval is 20 ms and remaining SFN (0 or 1) information in the 20 ms time interval is derived from an SS block index obtained through the PBCH decoding process, whereby the terminal may identify a corresponding SFN.

For example, as illustrated in FIG. 9, when remaining SFN is corresponding to SFN (3 bits), that is, 8 SFNs (0 to 7), interval 'a' is corresponding to SFNs corresponding to (0 or 1), interval 'b' is corresponding to SFNs corresponding to (2 or 3), interval 'c' is corresponding to SFNs corresponding to (4 or 5), and interval 'd' is corresponding to SFNs corresponding to (6 or 7). The terminal may obtain time interval information corresponding to a, b, c, or d, wherein a, b, c, and d time intervals are related to different parts of a scrambling sequence according to the above proposed scrambling method, respectively and may identify a corresponding SFN from among two SFNs (radio frames) which exist for each 20 ms, based on SS block index information obtained through a PBCH decoding process, thereby deriving a 3-bit remaining SFN value. The two radio frames (20 ms) have the same periodicity as an SS burst set periodicity, and thus, the terminal may obtain information associated with a corresponding radio frame from among two radio frames in each interval as described above, based on detected SS block index (one in the range of 0 to L) in each SS burst set periodicity. In this instance, the physical time location of an SS block within an SS burst set periodicity corresponding to a time interval of two radio frames are determined in advance. In the above example, although it is described that scrambling is performed using different scrambling sequences in each SS burst set, scrambling can be performed based on an SS block unit or based on an SS burst unit, as illustrated in FIG. 4 (as a matter of course, initialization is performed for each 8 radio frames (k=3) as given in Equation 1). The terminal identifies the proposed scrambling method and an SS block index, so as to obtain a remaining SFN value (e.g. 3 LSB of SFN). In this instance, order of the operation of identifying a scrambling method and the operation of identifying an SS block index may be permutable.

As another example, unlike the above method, instead of a scrambling method, or together with the scrambling method, the a, b, c, and d intervals as in FIG. 9 may be indicated through a CRC masking method as shown in Table 5 and Equation 3. In this instance, when the proposed scrambling method is used together, the CRC masking method proposed below may be an additional check point, thereby dramatically reducing the probability of an error that obtains a wrong SS burst set boundary. That is, each CRC masking value indicates the a, b, c, and d intervals, and one of the two SFNs (radio frames) in the indicated interval may be derived through an SS block index value, as above proposed method. A CRC bit $a_0, a_1, a_2, a_3, \ldots, a_{A-1}$ having a length of 16 is added to an information bit which is transmitted in a single PBCH. In this instance, a PBCH CRC mask value of Table 5 may be scrambled with a CRC bit and may be transmitted in order to indicate a remaining SFN value. Depending on the range of a remaining SFN value, the range of the "SS burst set periodicity part within NR-PBCH scheduling periodicity" value in Table 5 may be differently defined, and associated RBCH CRC mask bits may be defined as sequences to be orthogonal to each other. In Table 5 provided below shows an example of CRC masking for informing a remaining SFN in a PBCH.

TABLE 5

| SS burst set periodicity part within NR-PBCH scheduling periodicity | NR-PBCH CRC mask $<x_{ant, 0}, x_{ant, 1}, \ldots, x_{ant, 15}>$ |
| --- | --- |
| a | <0, 0, 0, 0, 0, 0, 0, 0, 0, 0, 0, 0, 0, 0, 0, 0> |
| b | <1, 1, 1, 1, 1, 1, 1, 1, 1, 1, 1, 1, 1, 1, 1, 1> |
| c | <0, 1, 0, 1, 0, 1, 0, 1, 0, 1, 0, 1, 0, 1, 0, 1> |
| d | <1, 0, 1, 0, 1, 0, 1, 0, 1, 0, 1, 0, 1, 0, 1, 0> |

As another example, the a, b, c, and d intervals may be indicated by using different redundancy versions (RV=0, 2, 1, 3) that are applied during PBCH channel coding. In this instance, when the proposed scrambling method is used together, the RV method proposed below may be an additional check point and may reduce the probability of an error that obtains a wrong SS burst set boundary. That is, each RV value may indicate an a, b, c, or d interval, and a radio frame value in the indicated interval may derive a final remaining SFN value through an SS block index value. For example, the terminal assumes that an associated interval is the interval a when RV=0 is obtained by successful decoding. The terminal assumes that an associated interval is the interval b when RV=2 is obtained by successful decoding. The terminal assumes that an associated interval is the interval c when RV=1 is obtained by successful decoding. The terminal assumes that an associated interval is the interval d when RV=3 is obtained by successful decoding. Subsequently, the terminal derives one of the two SFNs based on an SS block index, thereby determining a remaining SFN value.

As described above, time intervals of 80 ms may be indicated by 7 bits of an SFN field in an MIB. However, various types of timing information corresponding to 20 ms, 10 ms, or 5 ms within 80 ms corresponding to remaining 3-bit SFN information may be indicated according to the method proposed below.

Table 6 illustrates embodiments of the present disclosure according to a method of indicating 20 ms/10 ms/5 ms timing within PBCH TTI (scheduling periodicity) 80 ms.

TABLE 6

|  | 20-ms timing boundary (two radio frames) | 10-ms timing boundary (one radio frame) | 5-ms timing boundary (SS block transmission window) |
| --- | --- | --- | --- |
| Embodiment #1 | MIB: SFN field (three LSB among ten bits) | | MIB: 5-ms timing field (SS block transmission window) (1 bit), or DMRS mapping order, or DMRS sequence (initialization) |

TABLE 6-continued

|  | 20-ms timing boundary (two radio frames) | 10-ms timing boundary (one radio frame) | 5-ms timing boundary (SS block transmission window) |
|---|---|---|---|
| Embodiment #2 | PBCH data scrambling (4 hypothesis) | MIB: SFN field (last one bit among ten bits) or MIB: indicate through a new 1-bit field as opposed to SFN field | MIB: 5-ms timing field (SS block transmission window) (1 bit), or DMRS mapping order, or DMRS sequence (initialization) |
| Embodiment #3 | PBCH data scrambling (4 hypothesis) | — | MIB: 5-ms timing field (SS block transmission window) (2 bits) |
| Embodiment #4 | — | PBCH data scrambling (8 hypothesis) | MIB: 5-ms timing field (SS block transmission window) (1 bit), or DMRS mapping order, or DMRS sequence (initialization) |
| Embodiment #5 | — | — | MIB: 5-ms timing field (SS block transmission window) (4 bits) |

According to embodiment #1, as another additional embodiment, timing information corresponding to the entire 1024 radio frames is provided through an SFN field (10 bits) in an MIB, and a remaining 5-ms timing may be indicated using a 5-ms timing field (1 bit) defined in the MIB. Alternatively, in the case of the 5-ms timing, a base station may indicate its information corresponding to 1 bit to a terminal, based on a DMRS mapping order or DMRS sequence initialization, without using the information in the MIB. According to the indication method based on a DMRS mapping order, the terminal may determine a corresponding 5-ms timing interval from among two 5-ms timing intervals included in a radio frame timing (10 ms) according to a predetermined rule. The terminal determines a first 5-ms timing interval as the corresponding timing interval when a PBCH DMRS sequence is mapped in order from a low frequency index (i.e. Resource Element, RE) to a high frequency index. The terminal determines a second 5-ms timing interval as the corresponding timing interval when the PBCH DMRS sequence is mapped in the opposite order. As a matter of course, the terminal may determine a first 5-ms timing interval as the corresponding 5-ms timing interval when the PBCH DMRS sequence is mapped in order from a high frequency index to a low frequency index, and may determine a second 5-ms timing interval as the corresponding 5-ms timing interval when the PBCH DMRS sequence is mapped in the opposite order. The terminal may determine the corresponding 5-ms timing interval according to a predetermined rule. As another method of indicating a 5-ms timing interval in a radio frame through a PBCH DMRS, the terminal may obtain a 5-ms timing interval information among two blind decoding candidates (i.e. first and second 5 ms timing in a radio frame) corresponding to 1 bit-information by using DMRS sequence initialization. Also, the 5-ms timing interval may be indicated by PBCH DMRS sequence, instead of using a PBCH DMRS mapping order as described above.

A PN sequence (pseudo-random sequence) c(i) which is took into consideration for generating the PBCH DMRS sequence may use two polynomials based on a Gold sequence having a length of 31, as provided below. A first polynomial may be x31+x3+1 and a second polynomial may be x31+x3+x2+1+1. As given in the equation provided below, as an initial value Cinit, a fixed value is used for the first polynomial, and the second polynomial is generated using a Cell ID or a Cell ID and different time information (SS block index 2 to 3 bits and 5 ms timing) according to the BPSK or QPSK modulation scheme.

$c(n)=(x_1(n+N_C)+x_2(n+N_C))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ [Equation 4]

$N_C=1600$, and a first m sequence may be initialized with $x_1(0)=1, x_1(n)=0, n=1, 2, \ldots, 30$ as the fixed value. A second m sequence may be determined as $c_{init}=\Sigma_{i=0}^{30} x_2(i) \cdot 2^i$ A Cinit value proposed below may determine the initial value of the second m sequence as $$x_2(i) = \left\lfloor \frac{c_{init}}{2^i} \right\rfloor \mod 2, \ i = 0, 1, \cdots, 30.$$

1. the case in which a PBCH DMRS sequence is initialized at the start of each SS block in order to indicate a 5-ms timing on top of the SS block index with 2 or 3 bits A PN sequence (pseudo-random sequence) generator may use one of $c_{init}=(n_{ssblock}+1)\cdot(2N_{ID}^{cell}+1)\cdot 2^{11}+2\cdot N_{ID}^{cell}+N_{5ms}^{SSblock}$, $c_{init}=n_{ssblock}\cdot 2^{11}+2\cdot N_{ID}^{cell}+N_{5ms}^{SSblock}$, $c_{init}=(N_{ID}^{cell}+1)\cdot(2n_{ssblock}+1)\cdot 2^4+2\cdot n_{ssblock}+N_{5ms}^{SSblock}$, and $c_{init}=N_{ID}^{cell}\cdot 2^4+2\cdot n_{ssblock}+N_{5ms}^{SSblock}$.

Initialization needs to be performed using the Cinit value at the start of each SS block in an SS burst set.

$n_{ssblock}$: SS block index, and having a range of 0 to 3 (2 bits) or a range of 0 to 7 (3 bits)

$N^{cell}_{ID}$: NR cell ID value, and having a range of 0 to 1007 (10 bits)

$N^{SSblock}_{5ms}$: information associated with a SS block transmission interval (5 ms) timing, and having a range of 0 to 1

2. the case in which a PBCH DMRS sequence is initialized at the start of each OFDM symbol in each SS block in order to indicate a 5-ms timing A PN sequence (pseudo-random sequence) generator may use one of $c_{init}=(2*(n_{ssblock}+1)+l'+1) \cdot (2N_{ID}^{cell}+1) \cdot 2^{11} + 2 \cdot N_{ID}^{cell} + N_{5ms}^{SSblock}$ and $c_{init}=(2*(n_{ssblock}+1)+l'+1) \cdot 2^{10} + 2 \cdot N_{ID}^{cell} + N_{5ms}^{SSblock}$.

Initialization needs to be performed using the Cinit value the start of each OFDM symbol in each SS block in an SS burst set.

$n_{ssblock}$: SS block index, and having a range of 0 to 3 (2 bits) or a range of 0 to 7 (3 bits)

$N^{cell}_{ID}$: NR cell ID value, and having a range of 0 to 1007 (10 bits).

l': an OFDM symbol index for PBCH DMRS transmission in an SS block, and having a range of 0 to 1 or a range of 0 to 13

$N^{SSBlock}_{5ms}$: information associated with a SS block transmission interval (5 ms) timing, and having a range of 0 to 1

The $n_{ssblock}$ in the equations for the proposed Cinit assumes that SS block index information with 3 bits is considered, but SS block index information with 2 bits may be considered depending on maximum number of SS block candidates in a frequency range (e.g. L=4 in below 3 GHz). In this instance, the equation can be changed based on the fact that $n_{ssblock}$ is information corresponding to 2 bits.

According to embodiment #2, a terminal identifies the above proposed scrambling scheme (as an example, a different part of a scrambling sequence is applied for each SS burst set periodicity of 20 ms in a time interval of 80 ms (in the same manner as operation 495 of FIG. 4 and FIG. 8, a different part of a scrambling sequence (e.g., a, b, c, and d) is applied for each SS burst set, and in the same manner as FIG. 9 a different part of a scrambling sequence is applied for each SS burst set)). Also, the terminal detects a PBCH in an SS block, and obtains information associated with a time interval in which the PBCH is detected from among four time intervals of 20 ms (e.g., a, b, c, and d time intervals) within 80 ms based on scrambling information.

As illustrated in FIG. 9, for example, when the parts of the scrambling sequence applied to respective time intervals of 20 ms are referred to as a, b, c, and d, the terminal may identify a time interval where a PBCH is detected through a descrambling process exists from among a, b, c, and d time intervals, through a decoding process. Boundaries of 20 ms (default SS burst set periodicity)-intervals (i.e., a, b, c, and d) within a PBCH scheduling periodicity (80 ms) may be indicated through different PBCH data scrambling. Subsequently, a radio frame timing (=10 ms) in a 20-ms interval may be indicated by 1-bit information (MIB) transferred through a PBCH. An SS block transmission window (5 ms) within the indicated radio frame timing (10 ms) may be indicated using a 5-ms timing indication field in the MIB, an PBCH DMRS sequence allocation order on a physical resource, or a PBCH DMRS sequence, in the same manner as the embodiment #1.

According to embodiment #3, as illustrated in FIG. 9, boundaries of 20 ms (default SS burst set periodicity)-intervals (i.e., a, b, c, and d) within a PBCH scheduling periodicity (80 ms) may be indicated through different PBCH data scrambling as described in the above embodiment and method. Subsequently, an SS block transmission window (5 ms) timing within the 20-ms interval (indication of four 5-ms intervals within the 20-ms interval) may be explicitly indicated through 2-bit information (MIB) transferred by a PBCH. In this instance, radio frames corresponding to a 10-ms timing may be derived by the indication of the SS block transmission window (5 ms) within the 20-ms period. Therefore, 10-ms timing may not need to be indicated through the MIB.

As embodiment #4, as described above, together with the above proposed scrambling, the terminal may detect a PBCH in an SS block, and obtain information associated with a time interval where the PBCH exists from among eight 10-ms time intervals within 80 ms (e.g., a, b, c, d, e, f, g or h time intervals as shown in the diagrams 490 of FIG. 8), through scrambling information. As illustrated in FIG. 8, for example, when the parts of the scrambling sequence applied to respective time intervals of 10 ms are referred to as a, b, c, d, e, f, g, and h, the terminal may identify a time interval where the PBCH that is detected through a descrambling process exists from among a, b, c, d, e, f, g, and h time intervals, through a decoding process. According to FIG. 8, the boundaries of 10-ms intervals (radio frames) within a PBCH scheduling periodicity (80 ms) (e.g., a, b, c, d, e, f, g, and h) may be indicated through different PBCH data scrambling. Subsequently, an SS block transmission window (5 ms) timing within the 10 ms may be indicated by a PBCH DMRS sequence mapping order or a PBCH DMRS sequence, or may be indicated by one-bit information (MIB) transferred by a PBCH, as proposed in the above described embodiments.

According to embodiment #5, a timing in the 80-ms time interval may be indicated to a terminal using a 5-ms timing field (4 bits) in the MIB. In this instance, an SFN field in the MIB has 7 bits, whereas a 5-ms timing filed has 4 bits. A base station may provide an SFN value/radio frame timing and a 5-ms timing to a terminal using the 4 bits.

Embodiments associated with other combinations of the proposed method of indicating the timing of a time interval can be also considered. For example, a 20-ms timing may be indicated by an SFN field in the MIB, and information corresponding to 10/5-ms timing in the 20-ms timing may be indicated by a 5-ms timing field (2 bits) in the MIB. Therefor, the present disclosure does not limit the methods to the proposed embodiments, and may also include embodiments that utilize the combination of the methods of indicating a time interval.

A method for generating and applying a second PBCH scrambling sequence:

A terminal detects a PBCH DMRS for decoding a PBCH before decoding the PBCH. Through the DMRS, the terminal may detect channel estimation information for PBCH decoding and a part or the entirety of an SS block (2 or 3 bits) index information, before decoding a PBCH. As described below, the maximum number of SS blocks (L) and corresponding subcarrier spacing are defined according to a frequency band range. Therefore, as shown in the equation associated with Cinit which is used for the PBCH DMRS sequence generation to indicate the 5-ms timing, an SS block index ($n_{ssblock}$) corresponding to a maximum of 2 or 3-bit information may be indicated to the terminal through the PBCH DMRS sequence, before detecting the PBCH. As the indication method through the DMRS, a DMRS sequence may be generated by taking into consideration corresponding SS block index information, and may be transmitted. Since 64 SS blocks exist in a frequency band over 6 GHz and thus, 6-bit SS block index information may be indicated to the terminal as a combination of information bits in the PBCH and the PBCH DMRS.

TABLE 7

| Frequency range | Supported SCS (kHz) | Max. number of SS blocks (L) |
|---|---|---|
| ~3 GHz | 15 or 30 | 4 |
| 3~6 GHz | 15 or 30 | 8 |
| 6~52.6 GHz | 120 or 240 | 64 |

Table 7 shows a supported SCS and the maximum number of SS blocks per frequency range.

Therefore, to perform the second PBCH scrambling scheme, SS block index information detected upon reception of the PBCH DMRS may be used in addition to a Cell ID. This second PBCH scrambling is performed after channel coding process. That is, in the same manner as the first PBCH scrambling scheme, a scrambling sequence is initialized at the start of each SS block or at the start of each SS burst set periodicity (e.g., 20 ms) based on a Cell ID, and may use the same for the second PBCH scrambling. When the SS block index information is additionally used for generating the PBCH scrambling sequence, the terminal may obtain an additional time diversity gain in a 5-ms transmission window through which SS blocks are transmitted, and becomes robust against interference from an adjacent cell in a 20-ms time interval. The biggest benefit of the method is that performance may be improved without complexity of the additional PBCH decoding.

Referring to FIG. 10, for example, it is assumed that four SS burst sets exist within PBCH scheduling periodicity (80 ms), and a maximum of 4 SS blocks (L=4) exists within a single SS burst set (20 ms). Also, all the SS blocks in a single SS burst set are expected to be transmitted and received within a 5-ms SS block timing window, so as to minimize the amount of power consumption at both terminal and base station. As another example, the case in which different PBCH scrambling are applied to eight time intervals within the PBCH scheduling periodicity (80 ms) may also be applicable. However, the present disclosure describes an example of indicating four 20-ms time intervals within 80 ms through different PBCH scrambling for each of description.

When four different scrambling sequence parts of the above discussed PBCH scrambling sequence (first scrambling) are applied to every SS burst set periodicity (20 ms) with in PBCH scheduling periodicity (80 ms), respectively, as shown in FIGS. 8 and 9, the same part of scrambling sequence may be applied to PBCH in all the SS blocks within a SS burst set periodicity 20 ms. Therefore, in this case, when performing PBCH combining within 20 ms, diversity gain and performance gain obtained through interference randomization cannot be obtained, which is a drawback. However, according to the proposed embodiment, for additional PBCH scrambling within SS burst set periodicity 20 ms, it is possible to utilizes SS block index information (2 or 3 bits) detected by receiving a PBCH DMRS before decoding PBCH data, and thus, the terminal may detect a PBCH to which an additional PBCH scrambling (second scrambling) is applied.

For example, when the terminal detects SS block index 1 through blind detecting of PBCH DMRS sequence, it is assumed that a PBCH scrambling sequence part which corresponds to one of "A2, B2, C2, D2" in the second PBCH scrambling sequence c(i) (A1, A2, . . . , D4) is applied to each 20-ms time interval using the same PBCH scrambling sequence part (A2=B2=C2=D2), in FIG. 10. Therefore, for example, PBCH detection may be performed through four different parts of scrambling sequence corresponding to A1, A2, A3, and A4 which are respectively associated with four SS block indices in a first SS burst set periodicity (e.g., 20 ms). In the same manner, the second PBCH scrambling may be performing by utilizing four different parts of scrambling sequence corresponding to B1, B2, B3, and B4, which are respectively associated with four SS block indices in a second 20-ms interval (B), C1, C2, C3, and C4, which are respectively associated with four SS block indices in a third 20-ms interval (C), D1, D2, D3, and D4, which are respectively associated with four SS block indices in a fourth 20-ms interval (D).

In the example, when a PBCH is successfully detected from a part corresponding to a PBCH scrambling sequence 'B2' part, the terminal may determine that an SS block existing in an interval corresponding to a second 20-ms interval within 80 ms (a second SS burst set period) is detected. Also, a 10-ms timing (radio frame timing) and a 5-ms timing (SS block window timing) may be derived by the terminal, and may be indicated by the base station, according to the above proposed methods. Different PBCH scrambling parts, the number of which corresponds to a value obtained by multiplying the number of 10-ms or 20-ms timings (C) to which the first PBCH scrambling is applied within the PBCH scheduling periodicity (3 bits, 80 ms) and the number of SS block indices (S) (2 or 3 bits, 4 or 8) that is indicated by a PBCH DMRS and to which the second PBCH scrambling is applied, may be applied to SS blocks within the PBCH scheduling periodicity, for entire PBCH scrambling. In the above example, it can be considered that PBCH scrambling is applied a number of times equal to a value obtained by multiplying four 20-ms timings (C=4) and four SS block indices (S=4) via the PBCH DMRS. According to the proposed method, an effect of applying different scrambling sequence parts for every PBCH transmitted in all SS blocks may be obtained, and complexity of descrambling by a terminal may not be significantly increased.

Also, when the maximum number of SS block candidates is 64, such as the case of the frequency band over 6 GHz, all SS block indices cannot be indicated through the PBCH DMRS sequence initialization (up to a maximum of 3 bits via PBCH DMRS). Therefore, different scrambling sequence parts for second PBCH scrambling, the number of which corresponds to the number of SS block indices (a maximum of 8 SS block indices) which can be indicated by PBCH DMRS per every 10 ms or 20 ms within 80 ms, may be applied to a PBCH coded bit (PBCH data). For example, when the number of 3-bit SS block indices (8 SS block indices) is assumed in a 20-ms timing, a PBCH scrambling sequence having a length that is 8 times of a PBCH transmission bit length may be generated and may be repeatedly applied for up to 64 SS blocks in 20 ms. Here, as shown in the table provided below, it is assumed that the length of data/scrambling sequence corresponding to one (or each) PBCH scrambling sequence index is the same as the number of coded bits corresponding to one PBCH transmission. As shown in the table provided below, 8 repetitive scrambling sequences are applied to PBCH data in 64 SS blocks within a 20-ms timing boundary, whereby PBCH detection performance may be improved by performing additional PBCH combining within 20 ms according to the proposed second PBCH scrambling within 20 ms.

For 64 SS blocks, PBCH scrambling based 3-bit PBCH DMRS SS block indication will be described with reference to Table 8 provided below.

TABLE 8

|  | 1st 20 ms | 2nd 20 ms | 3rd 20 ms | 4th 20 ms |
|---|---|---|---|---|
| Maximum number of SS blocks | 64 SS blocks | 64 SS blocks | 64 SS blocks | 64 SS blocks |
| PBCH scrambling sequence index | 0, 1, . . . 7,<br>0, 1, . . .<br>7, . . . 0,<br>1, . . . 7 | 8, 9, . . . , 15,<br>8, 9, . . . ,<br>15, . . . 8,<br>9, . . . , 15 | 16, 17, . . . 23,<br>16, 17, . . . 23,<br>16, 17, . . . 23 | 24, 25, . . . 31,<br>24, 25, . . . 31,<br>24, 25, . . . 31 |

FIG. 11 illustrates a PBCH scrambling procedure performed in a first 20-ms time interval (first 20 ms) from among the examples of Table 8. The number of PBCH scrambling sequence indices (the number of SS blocks indicated by a PBCH DMRS) is depending on the number of information bits transferred by a PBCH DMRS within a predetermined 10-ms time interval or 20-ms time interval. When it is assumed that 3 bits are used, a maximum of 8 different scrambling sequence parts may be repetitively applied for each PBCH transmission (in 64 SS blocks). Referring to FIG. 11 and Table 8, when the scrambling sequence is initialized for each 20 ms, a second PBCH scrambling sequence may be generated which corresponds to scrambling sequence indices (0, 1, . . . , 7) which are respectively associated with a maximum of 8 SS block indices that may be obtained through a DMRS for each 20 ms. The terminal may recognize a PBCH scrambling sequence that is applied to a given 20-ms time interval, based on 0 to 7 SS block index information, which correspond to 3 bits and are obtained through PBCH DMRS detection. Based on the information, the terminal may perform PBCH descrambling, and perform PBCH data decoding. In the case of a timing associated with a 20-ms time interval, the terminal may recognize a corresponding 20-ms time interval within a 80-ms time interval, through the previously proposed method (SFN indication method via implicit or explicit manner). Accordingly, the terminal performs PBCH descrambling without further blind decoding. However, the base station performs additional PBCH data scrambling within a 10-ms or 20-ms boundary by utilizing a maximum of 3-bit SS block index information transferred by a PBCH DMRS, and transmits the same. The above described transmission method may provide more reliable PBCH data decoding to the terminal, whereby the performance of the system can be improved.

The above-described example is merely an example, and the proposed method may be applied to the case of indicating 10-ms or 5-ms boundaries within PBCH scheduling periodicity (80 ms) using PBCH scrambling.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A wireless user device comprising:
one or more processors; and
memory storing instructions that, when executed by the one or more processors, cause the wireless user device to:
receive, from a base station, a plurality of synchronization signal (SS) blocks in eight consecutive radio frames, wherein each SS block, of the plurality of SS blocks, comprises a physical broadcast channel (PBCH), and wherein each radio frame, of the eight consecutive radio frames, has a duration of 10 ms;
descramble, based on a sequence part of four sequence parts of a sequence, physical broadcast channels (PBCHs) in two consecutive radio frames of the eight consecutive radio frames, wherein the two consecutive radio frames comprise a maximum of four SS blocks;
receive a PBCH demodulation reference signal (DMRS) associated with two bits of an SS block index; and
perform, based on the two bits of the SS block index, a descrambling on at least one PBCH, wherein the at least one PBCH is associated with the PBCH DMRS, and wherein the at least one PBCH is in the two consecutive radio frames.

2. The wireless user device of claim 1, wherein the sequence is scrambling sequence c(i) that is initialized, based on $c_{init} = N_{ID}^{cell}$, at a start of each radio frame that satisfies of mod 8=0, where $N_{ID}^{cell}$ is a cell identifier of the base station, and $n_f$ is associated with a system frame number (SFN), wherein the instructions, when executed by the one or more processors, cause the wireless user device to perform the descrambling on the at least one PBCH by:
descrambling, using a second sequence associated with the two bits of the SS block index, the at least one PBCH.

3. The wireless user device of claim 1, wherein the instructions, when executed by the one or more processors, cause the wireless user device to:
descramble, based on a second sequence part of the four sequence parts of the sequence, PBCHs in second two consecutive radio frames of the eight consecutive radio frames;
descramble, based on a third sequence part of the four sequence parts of the sequence, PBCHs in third two consecutive radio frames of the eight consecutive radio frames;
descramble, based on a fourth sequence part of the four sequence parts of the sequence, PBCHs in fourth two consecutive radio frames of the eight consecutive radio frames;
receive a second PBCH DMRS indicating two bits of a second SS block index; and
perform, based on the two bits of the second SS block index, a descrambling on at least one second PBCH, wherein the at least one second PBCH is associated with the second PBCH DMRS, and wherein the at least one second PBCH is in:
the second two consecutive radio frames;
the third two consecutive radio frames; or
the fourth two consecutive radio frames.

4. The wireless user device of claim 1, wherein the instructions, when executed by the one or more processors, cause the wireless user device to:
determine, based on a frequency range, a maximum quantity of SS blocks to be four SS blocks within the two consecutive radio frames.

5. The wireless user device of claim 1,
wherein each SS block, in the two consecutive radio frames, is associated with a different descrambling value for a second sequence.

6. The wireless user device of claim 1, wherein the instructions, when executed by the one or more processors, cause the wireless user device to perform the descrambling on the at least one PBCH by:
descrambling, using a second sequence associated with the two bits of the SS block index, the at least one PBCH.

7. The wireless user device of claim 6, wherein the instructions, when executed by the one or more processors, cause the wireless user device to perform the descrambling on the at least one PBCH by:
initializing, based on a cell identifier of the base station, the second sequence.

8. The wireless user device of claim 1, wherein the instructions, when executed by the one or more processors, cause the wireless user device to:
initialize, based on a cell identifier of the base station, a sequence generator to descramble PBCHs in the eight consecutive radio frames; and
generate, based on the initialized sequence generator, the sequence, wherein the sequence is associated with PBCH descrambling, wherein the sequence generator is initialized every eight consecutive radio frames.

9. The wireless user device of claim 1, wherein the instructions, when executed by the one or more processors, cause the wireless user device to:
receive, from the base station, at least one downlink channel transmission,
wherein the wireless user device is a user equipment (UE) supporting at least one 3rd generation partnership project (3GPP) New Radio (NR) system protocol.

10. The wireless user device of claim 1, wherein a first PBCH of the PBCHs in the two consecutive radio frames comprises:
a plurality of bits associated with a system frame number; and
one bit indicating a 5 ms timing duration in which the first PBCH is transmitted.

11. The wireless user device of claim 10, wherein a first value of the one bit indicating the 5 ms timing duration corresponds to a first half of a radio frame in which the first PBCH is transmitted, and
wherein a second value of the one bit indicating the 5 ms timing duration corresponds to a second half of the radio frame in which the first PBCH is transmitted.

12. The wireless user device of claim 10, wherein an initialization associated with the PBCH DMRS is based on the one bit indicating the 5 ms timing duration in which the first PBCH is transmitted.

13. A wireless user device comprising:
one or more processors; and
memory storing instructions that, when executed by the one or more processors, cause the wireless user device to:
receive, from a base station, a plurality of synchronization signal (SS) blocks in eight consecutive radio frames, wherein each SS block, of the plurality of SS blocks, comprises a physical broadcast channel (PBCH), and wherein each radio frame, of the eight consecutive radio frames, has a duration of 10 ms;
descramble, based on a sequence part of four sequence parts of a sequence, physical broadcast channels (PBCHs) in two consecutive radio frames of the eight consecutive radio frames, wherein the two consecutive radio frames comprise a maximum of eight SS blocks or a maximum of 64 SS blocks;
receive a PBCH demodulation reference signal (DMRS) associated with three bits of an SS block index; and
perform, based on the three bits of the SS block index, a descrambling on at least one PBCH, wherein the at least one PBCH is associated with the PBCH DMRS, and wherein the at least one PBCH is in the two consecutive radio frames.

14. The wireless user device of claim 13, wherein the sequence is scrambling sequence c(i) that is initialized, based on $c_{init}=N_{ID}^{cell}$, at a start of each radio frame that satisfies of mod 8=0, where $N_{ID}^{cell}$ is a cell identifier of the base station, and $n_f$ is associated with a system frame number (SFN), wherein the instructions, when executed by the one or more processors, cause the wireless user device to perform the descrambling on the at least one PBCH by:
descrambling, using a second sequence associated with the three bits of the SS block index, the at least one PBCH.

15. The wireless user device of claim 13, wherein the instructions, when executed by the one or more processors, cause the wireless user device to:
  descramble, based on a second sequence part of the four sequence parts of the sequence, PBCHs in second two consecutive radio frames of the eight consecutive radio frames;
  descramble, based on a third sequence part of the four sequence parts of the sequence, PBCHs in third two consecutive radio frames of the eight consecutive radio frames;
  descramble, based on a fourth sequence part of the four sequence parts of the sequence, PBCHs in fourth two consecutive radio frames of the eight consecutive radio frames;
  receive a second PBCH DMRS indicating three bits of a second SS block index; and
  perform, based on the three bits of the second SS block index, a descrambling on at least one second PBCH, wherein the at least one second PBCH is associated with the second PBCH DMRS, and wherein the at least one second PBCH is in:
    the second two consecutive radio frames;
    the third two consecutive radio frames; or
    the fourth two consecutive radio frames.

16. The wireless user device of claim 13, wherein the instructions, when executed by the one or more processors, cause the wireless user device to:
  determine, based on a first frequency range, a maximum quantity of SS blocks to be eight SS blocks within the two consecutive radio frames; or
  determine, based on a second frequency range, a maximum quantity of SS blocks to be 64 SS blocks within the two consecutive radio frames.

17. The wireless user device of claim 13,
  wherein each SS block, in the two consecutive radio frames, is associated with a different descrambling value for a second sequence, and
  wherein the two consecutive radio frames comprises a maximum of eight SS blocks.

18. The wireless user device of claim 13, wherein the instructions, when executed by the one or more processors, cause the wireless user device to perform the descrambling on the at least one PBCH by:
  descrambling, using a second sequence associated with the three bits of the SS block index, the at least one PBCH.

19. The wireless user device of claim 18, wherein the instructions, when executed by the one or more processors, cause the wireless user device to perform the descrambling on the at least one PBCH by:
  initializing, based on a cell identifier of the base station, the second sequence.

20. The wireless user device of claim 13, wherein the instructions, when executed by the one or more processors, cause the wireless user device to:
  initialize, based on a cell identifier of the base station, a sequence generator to descramble PBCHs in the eight consecutive radio frames; and
  generate, based on the initialized sequence generator, the sequence, wherein the sequence is associated with PBCH descrambling,
  wherein the sequence generator is initialized every eight consecutive radio frames.

21. The wireless user device of claim 13, wherein the instructions, when executed by the one or more processors, cause the wireless user device to:
  receive, from the base station, at least one downlink channel transmission,
  wherein the wireless user device is a user equipment (UE) supporting at least one 3rd generation partnership project (3GPP) New Radio (NR) system protocol.

22. The wireless user device of claim 13,
  wherein the two consecutive radio frames comprise a maximum of 64 SS blocks,
  wherein eight SS blocks, in the two consecutive radio frames, are associated with a same value indicated by the three bits of the SS block index, and
  wherein the same value, indicated by the three bits of the SS block index, is associated with a descrambling value for a second sequence.

23. The wireless user device of claim 22, wherein the instructions, when executed by the one or more processors, cause the wireless user device to perform the descrambling on the at least one PBCH by:
  descrambling, using the second sequence, the at least one PBCH.

24. The wireless user device of claim 23, wherein the instructions, when executed by the one or more processors, cause the wireless user device to perform the descrambling on the at least one PBCH by:
  initializing, based on a cell identifier of the base station, the second sequence.

25. The wireless user device of claim 13, wherein a first PBCH of the PBCHs in the two consecutive radio frames comprises:
  a plurality of bits associated with a system frame number; and
  one bit indicating a 5 ms timing duration in which the first PBCH is transmitted.

26. The wireless user device of claim 25, wherein a first value of the one bit indicating the 5 ms timing duration corresponds to a first half of a radio frame in which the first PBCH is transmitted, and
  wherein a second value of the one bit indicating the 5 ms timing duration corresponds to a second half of the radio frame in which the first PBCH is transmitted.

27. The wireless user device of claim 25, wherein an initialization associated with the PBCH DMRS is based on the one bit indicating the 5 ms timing duration in which the first PBCH is transmitted.

* * * * *